US006173368B1

(12) United States Patent
Krueger et al.

(10) Patent No.: US 6,173,368 B1
(45) Date of Patent: Jan. 9, 2001

(54) CLASS CATEGORIZED STORAGE CIRCUIT FOR STORING NON-CACHEABLE DATA UNTIL RECEIPT OF A CORRESPONDING TERMINATE SIGNAL

(75) Inventors: Steven D. Krueger, Dallas; Jonathan H. Shiell, Plano, both of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/092,133

(22) Filed: Jun. 5, 1998

Related U.S. Application Data

(60) Provisional application No. 60/048,772, filed on Jun. 6, 1997, provisional application No. 60/008,799, filed on Dec. 18, 1995, and provisional application No. 60/029,232, filed on Oct. 31, 1996.

(51) Int. Cl.[7] ................................................. G06F 13/28
(52) U.S. Cl. ............................ 711/135; 711/133; 712/205
(58) Field of Search ........................... 711/144, 133–139; 712/225, 205, 206; 345/186, 507, 188, 191–199, 202–203, 501–506, 302; 348/21–24, 173–206, 377–383, 441–6, 598, 703–817, 844, 901–914; 710/35

(56) References Cited

U.S. PATENT DOCUMENTS 5,561,780 * 10/1996 Glew et al. ....................... 711/126
5,651,137 * 7/1997 MacWilliams et al. ............. 711/141
5,745,728 * 4/1998 Genduso et al. ..................... 711/126
5,754,820 * 5/1998 Yamagami ............................ 711/133
5,761,468 * 6/1998 Emberson ............................ 712/207
5,813,041 * 9/1998 McIntyre, Jr. et al. .............. 711/167
5,860,158 * 1/1999 Pai et al. ............................. 711/118
5,875,482 * 2/1999 McIntyre, Jr. et al. .............. 711/167
5,915,262 * 6/1999 Bridgers et al. ..................... 711/143
5,944,815 * 8/1999 Witt .................................... 712/207

* cited by examiner

Primary Examiner—John A. Follansbee
Assistant Examiner—Stacy Whitmore
(74) Attorney, Agent, or Firm—Robert D. Marshall, Jr.; W. James Brady, III; Frederick J. Telekcy, Jr.

(57) ABSTRACT

A microprocessor (62) for coupling to an external read/write memory (70) having an addressable storage space for storing data. The microprocessor includes a data storage circuit (76) for storing a portion of the data, where that portion of data comprises non-cacheable data. The microprocessor further includes a class storage circuit (80) for storing a class identifier corresponding to the portion of the non-cacheable data, as well as an input (TERMINATE) for receiving a terminate signal and an input (CLASS) for receiving a class signal. Lastly, the microprocessor includes an indicator (82) for indicating that the portion of the non-cacheable data in the data storage circuit is expired in response to assertions of the terminate signal and the class signal matching the class identifier.

28 Claims, 10 Drawing Sheets

CLASS CATEGORIZED STORAGE CIRCUIT FOR STORING NON-CACHEABLE DATA UNTIL RECEIPT OF A CORRESPONDING TERMINATE SIGNAL

This application claims priority under 35 U.S.C. 119(e)(1) from U.S. Provisional Patent Application No. 60/048,772 filed Jun. 6, 1997.

CROSS-REFERENCES TO RELATED APPLICATIONS

The present application is related to co-pending United States Provisional Patent Application Number 60/008,799, filed Dec. 18, 1995, upon which U.S. patent application Ser. No. 08/769,195 filed Dec. 18, 1995 claims priority, now U.S. Pat. No. 6,032,225 issued Feb. 20, 2000, entitled "Microprocessor System With Burstable, Non-cacheable Memory Access Support", which is hereby incorporated herein by reference.

The present application is related to co-pending United States Provisional Patent Application Number 60/029,232, filed Oct. 31, 1996, upon which U.S. patent application Ser. No. 08/962,987 filed Oct. 31, 1997 claims priority, entitled "Microprocessor Circuits And Systems With Life Spanned Storage Circuit For Storing Non-cacheable Data", which is hereby incorporated herein by reference.

STATEMENT REGARDING FEDERALLY SPONSORED RESEARCH OR DEVELOPMENT

Not Applicable.

BACKGROUND OF THE INVENTION

The present embodiments relate to microprocessors, and are more particularly directed to microprocessor circuits, systems, and methods with a class categorized storage circuit for storing non-cacheable data.

As is evident in the field, modem high performance data processing systems are conventionally implemented using single-chip microprocessors as the central processing units (CPU), and using semiconductor random-access memory (RAM) as main system memory. The main memory is generally implemented in the form of random access memory (RAM) devices such as dynamic RAM (DRAM), which are of high density and low cost-per-bit; however, the access and cycle times of conventional DRAM memory are relatively slow, and are not able to keep up with the clock rates of modem microprocessors.

Conventional microprocessor-based data processing systems have addressed the performance limitations of main memory access, while still obtaining the low-cost benefit of high-density DRAM, through the use of cache memories. Cache memories are typically small blocks of high speed static RAM (SRAM), either on-chip with the microprocessor or off-chip (or both), for storing the contents of memory locations that are likely to be accessed in the near future. Typically, cache memory stores the contents of memory locations that are near neighbors to a memory location that was recently accessed; because microprocessors often access memory in a sequential fashion, it is likely that successive memory accesses in successive cycles will access memory addresses that are very close to one another in the memory space. Accordingly, by storing the neighboring memory location contents in a cache, a good portion of the memory accesses may be made by the microprocessor to cache, rather than to main memory. The overall performance of the system is thus improved through the implementation of cache memory. Some modem microprocessors include multiple levels of cache memory, with the capacity of the cache increasing (and its speed decreasing) with each successive level, to optimize performance. Intelligent cache design and implementation can greatly improve system performance by minimizing accesses to main memory.

Another approach toward improving memory access performance in microprocessor-based systems is the use of special memory access cycles, commonly referred to as "burst" access cycles. Burst memory access cycles are used, in the operation of the memory devices, to provide access to a series of memory locations. Typically, the burst access is performed by way of a memory controller chip placed between the microprocessor and main memory, and which operates in response to the address information and control signals presented by the microprocessor. Burst cycles are highly effective in improving the performance of memory accesses. For example, in a modern system having an eight-byte bus, a burst cycle can access thirty-two bytes of memory with the presentation of a single memory address in as few as five bus cycles (2-1-1-1), when using a best case cache. Burst access is also highly efficient using page mode DRAM, in which a thirty-two byte access may be performed in a bus cycle sequence of 8-3-3-3 (totaling seventeen bus cycles), and using special DRAM functions such as Early Data Out (EDO) and synchronous DRAM, in which thirty-two byte burst accesses may be accomplished, in the best case, with a bus cycle sequence of 6-1-1-1 (totaling nine bus cycles). This is a drastic improvement over the non-burst case in which access of a 32-byte line requires 64 cycles when accessed as a group of eight separate 4 byte reads (considering that non-burst accesses are generally not longer than 4 bytes). As such, burst mode memory access is typically twice to six times as fast as non-burst cycles.

In microprocessors utilizing the well-known "x86" architecture, including the so-called "Pentium-class" microprocessors (referring to microprocessors having functionality and instruction set compatibility with PENTIUM microprocessors available from Intel Corporation), burst memory access are linked to cache operations. In other words, in these x86-architecture microprocessors, burst memory operations are performed only in connection with cache line fill operations (reads from memory) and cache write-back operations (writes to memory). Given the cache architecture of these microprocessors, where most data and instruction retrieval is accomplished by way of cache memory, the performance provided by performing burst memory accesses for cache operations is quite high.

Caching typically works quite well for "true" memory locations, to and from which only the microprocessor writes and reads data using conventional memory access operations, because the microprocessor can ensure that its cache copy of the memory location matches the copy in main memory. So long as the cache and main memory copies of the same memory locations are the same, reading of the cache copy instead of the main memory copy will have no side effects. However, certain memory locations, such as those containing the status of an I/O device or those portions of the screen buffer that may be changed by a graphics accelerator, are volatile to the extent that cache copies of these memory locations would be frequently out-of-date. The reading of a cache copy of these volatile memory locations, in lieu of the main memory locations, could have significant side effects in system operation. Accordingly, accesses by the microprocessor to these volatile locations are blocked from being "cacheable" (i.e., from being stored in cache memory) in conventional IBM PC architecture systems, typically by the operation of a memory controller.

For example, the memory mapped register is generally a blocked area in the cacheable access sense, despite being accessed via conventional memory access, because the memory mapped register is often polled to detect changes in device status, responsive to which certain control functions are effected. If the memory-mapped register were cached, changes in device status would be reflected in the main memory copy of the memory-mapped register but not in the cached copy; periodic polling of the memory-mapped register would read the cache copy only, and would therefore not detect the sought-for change in device status, effectively bringing control to a standstill. By way of another example, the caching of non-memory devices such as memory-mapped I/O functions may cause additional side effects for those types of I/O devices which change state in response to a read operation on the bus, since reads of on-chip cache memory do not appear as bus cycles. Write-back caching also presents side effects for these non-memory locations, as the cache could contain a more up-to-date copy than main memory; since writes to write-back cache do not appear on the bus, the caching of these locations would appear to reorder writes performed on the bus.

Another example of a memory area that is volatile and therefore typically blocked from cacheable access is video memory, which is logically within the memory map of the microprocessor and physically located either within or separate from main memory (such as in a graphics adapter). Video memory is often under the control of a device other than the microprocessor, such as a graphics processor or graphics adapter, and is therefore not suitable for cacheable access by the main microprocessor as its contents are frequently changed outside of the control of the microprocessor. If a portion of video memory were to be stored in the microprocessor cache, the cache contents would likely be invalid for subsequent accesses because of the changes made by the graphics processor.

According to conventional x86 architecture microprocessors, therefore, burstable memory accesses are linked to the cacheability of the memory location to be accessed. For example, the PENTIUM microprocessor requests a burstable memory access by asserting a control signal at terminal CACHE# (the # indicating that the signal is active at a low logic level) during an access to memory (indicated by the microprocessor presenting a high logic level at terminal M/IO#). Responsive to this request, the memory controller determines if the memory address presented by the microprocessor is in a cacheable area of the memory space and, if so, asserts the KEN# input to the microprocessor and effects the burst access. According to this conventional implementation, if the microprocessor requests a burstable access to an area of memory that is blocked from cacheable access, the memory controller will not effect a burstable access, and will indicate the same by deasserting KEN#. Single transfer access to the desired memory location will then proceed.

By way of further background, still another consideration in the complexity in cache architectures is the existence and sometimes requirement of snoop capability. Snooping is known in the art, and generally includes two different types of snoop requests, each of which is associated with one or more memory locations identified by an explicit address that accompanies or corresponds to the snoop request. For example, a snoop request may be issued including an address, where the entire cache line which includes the addressed information is to be operated upon in response to the snoop request. In any event, as to the two types of snoop requests, generally a first type of such a request indicates to a cache (or caches) that the requesting circuit seeks to share the addressed information. If a cache does not have a copy of the addressed information, then it simply takes no action with respect to the request. On the other hand, if the cache does have a copy of the addressed information and that information has been modified since the time it was stored in the cache, then the cache outputs the addressed information to main memory. Therefore, the requesting circuit may then read the addressed information from main memory (or "snarf" it from the bus as it is being written from the cache to the main memory). The second type of snoop request indicates to a cache (or caches) that the requesting circuit seeks the addressed information and will change that information. Once again, if a cache does not have a copy of the addressed information, then it simply takes no action with respect to the request. On the other hand, if the cache does have a copy of the addressed information and that information has been modified since the time it was stored in the cache, then the cache also outputs the addressed information to main memory. However, note that because the requesting circuit will change the information, the outputting cache also must invalidate its own copy of the information to prevent subsequent use of information that has been changed.

Given the existence of snooping as introduced above, note also that it may further limit the types of information that are considered cacheable under current architectures. For example, assume there is a device which is external from a microprocessor and operates to alter data of the main memory used by the microprocessor. Assume further that this external device does not provide snooping capability. Therefore, the types of data associated with this external device are typically deemed non-cacheable because to allow otherwise would provide the danger that the type of data altered by this external device would exist in a cache on the microprocessor and would not be properly output by the cache to the main memory because of the lack of snooping capability of the device. Thus, snooping provides yet another complexity in the consideration of cache techniques and limitations.

In view of the above, the present inventors have recognized various limitations of the above factors regarding cacheability. Thus, below are presented various inventive embodiments which improve performance as measured against these prior art drawbacks.

BRIEF SUMMARY OF THE INVENTION

In the preferred embodiment, there is a microprocessor for coupling to an external read/write memory having an addressable storage space for storing data. The microprocessor includes a data storage circuit for storing a portion of the data, where that portion of data comprises non-cacheable data. The microprocessor further includes a class storage circuit for storing a class identifier corresponding to the portion of the non-cacheable data, as well as an input for receiving a terminate signal and an input for receiving a class signal. Lastly, the microprocessor includes an indicator for indicating that the portion of the non-cacheable data in the data storage circuit is expired in response to assertions of the terminate signal and the class signal matching the class identifier. Other circuits, systems, and methods are also disclosed and claimed.

DETAILED DESCRIPTION OF THE INVENTION

Figure 1:
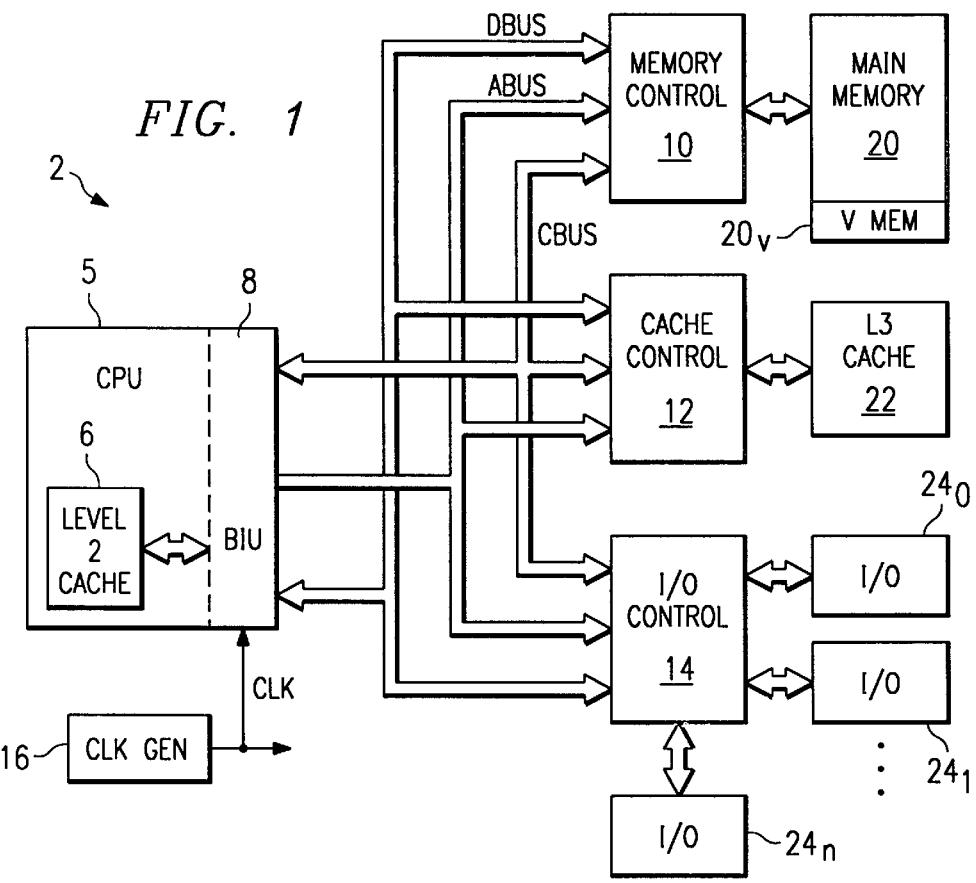
FIG. 1 is an electrical diagram, in block form, of a data processing system according to one inventive embodiment.

Referring first to FIG. 1, an exemplary microprocessor-based system 2 into which a first preferred embodiment is implemented is now described in detail. As shown in FIG. 1, system 2 includes central processing unit (CPU) 5 which, in this embodiment of the invention, is a microprocessor of the well-known "x86-architecture", and is preferably a Pentium-class microprocessor. CPU 5 includes a bus interface unit (BIU) 8. BIU 8 is circuitry within CPU 5 which serves to control and accomplish communication between CPU 5 and the remainder of system 2. In his embodiment, BIU 8 of CPU 5 is connected to a bus consisting of address bus ABUS, data bus DBUS, and control bus CBUS. As is conventional in the art, address bus ABUS is a bus upon which CPU 5 presents a binary address to access other elements of system 2, data bus DBUS is a bus for the communication of digital data between CPU 5 and the other system elements, and control bus CBUS is a bus by way of which control signals are communicated among the elements of system 2.

In system 2 of FIG. 1, various peripheral elements are connected to buses ABUS, DBUS, CBUS, by way of associated controllers, to perform usual system functions. Main memory 20 of system 2 is coupled to buses ABUS, DBUS, CBUS by memory controller 10; as such, memory controller 10 receives address values and control signals from CPU 5, and presents corresponding control signals to main memory 20 to accomplish the desired operation, which generally involves the communication of data to or from CPU 5 on data bus DBUS. System 2 also includes level 3 cache memory 22, which is connected to cache controller 12 in the conventional manner; cache controller 12 is connected to buses ABUS, DBUS, CBUS, to control the communication of data between CPU 5 and level 3 cache memory 22. In this example, level 3 cache memory 22 is a third level cache memory for system 2, with level 1 and level 2 cache memory present within CPU 5 (level 2 cache 6 being shown in FIG. 1). System 2 also includes I/O controller 14 which is connected to CPU 5 via buses ABUS, DBUS, CBUS, and which is also connected to several input/output devices 24. Input/output devices 24 may include typical input and output peripherals in system 2, such as a video monitor, a keyboard, a pointing device, disk drive subsystems, and the like. Controllers 10,12,14 are typically implemented by way of a so-called "chip set" that is designed to operate in conjunction with CPU 5. System 2 further includes clock generator circuit 16, which generates a periodic clock signal on line CLK for presentation to each of the elements of system 2, including CPU 5 via BIU 8, and from which internal clock signals may be generated within each of the various system elements. Accordingly, it is contemplated that system 2 corresponds to a typical modem computer, such as of the desktop, workstation or portable type, in which computer programs are stored within disk storage (represented by one of input/output devices 24) and downloaded to main memory 20 for operation.

Memory accesses are accomplished by the presentation of an address value on bus ABUS by CPU 5 in combination with the appropriate control signals on control bus CBUS (including a read/write selection signal); memory controller 10, in turn, presents the appropriate control signals to main memory 20 to access the desired location. In this example, a portion 20v of main memory 20 is video memory, which may be independently accessed by the one of I/O functions 24 that is the graphics adapter (or controller), either by way of buses ABUS, DBUS, CBUS or by way of a second bus (not shown); alternatively, video memory 20v could be implemented as its own device on the bus, as in the case of a PCI video card. Under the control of memory controller 10, which is generally accomplished by way of a handshaking protocol between it and CPU 5 via control bus CBUS, CPU 5 either presents data on data bus DBUS (in a memory write) or receives data from data bus DBUS (in a memory read).

As illustrated in FIG. 1, both memory and input/output traffic occurs by way of the same buses, namely address bus ABUS, data bus DBUS, and control bus CBUS. Accordingly, in this embodiment as is typical for x86-architecture microprocessor-based systems, input/output accesses are performed in a similar fashion as memory accesses described above, with CPU 5 presenting an address on address bus ABUS in combination with the appropriate control signals on line CBUS. For an I/O operation, the address on address bus ABUS corresponds to a particular one of input/output functions 24. Under the control of I/O controller 14, data is then communicated from CPU 5 to the selected I/O function 24 via data bus DBUS (for an output operation) or from the selected I/O function 24 to CPU 4 via data bus DBUS (for an input operation).

Figure 2:
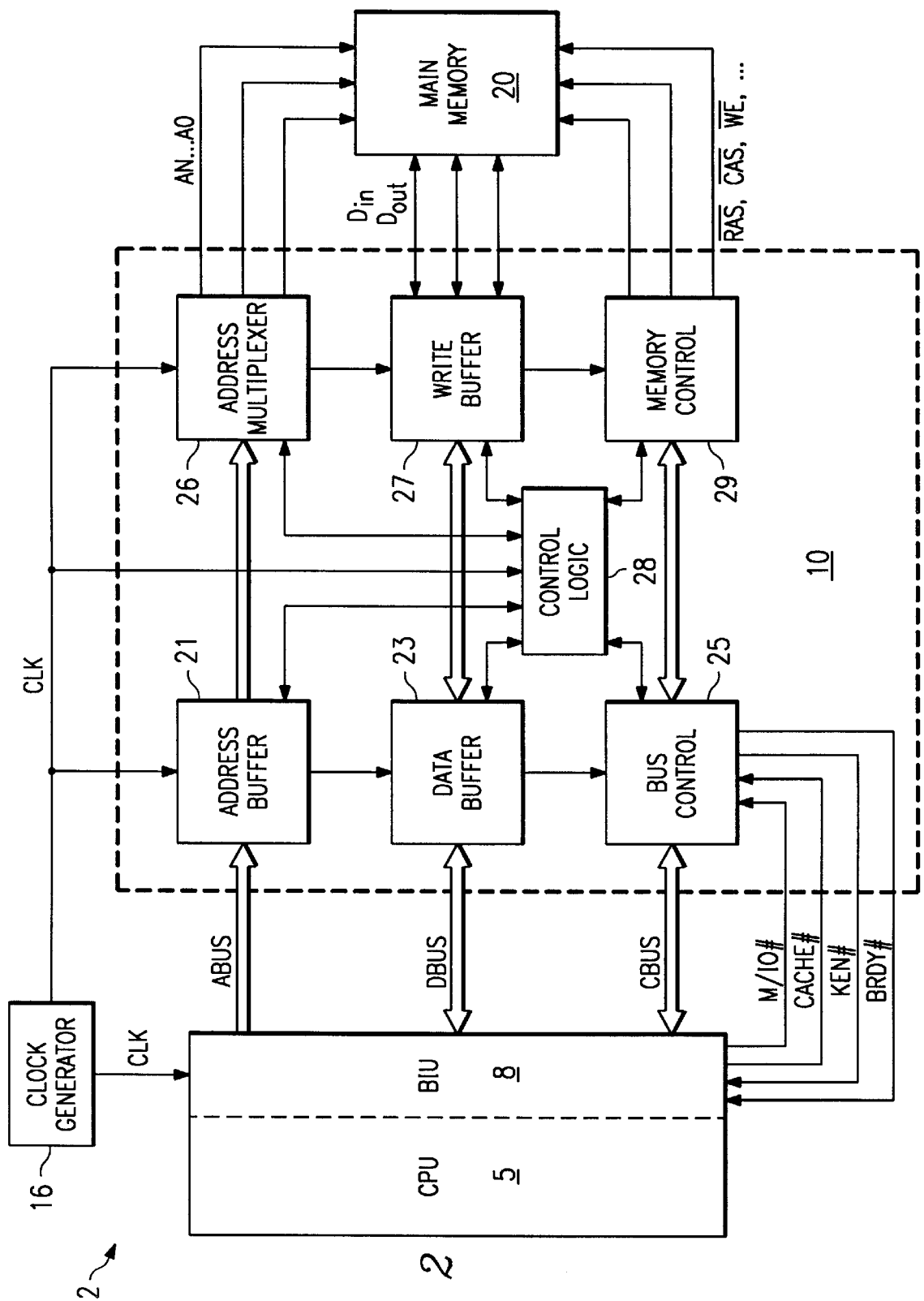
FIG. 2 is an electrical diagram of a first embodiment, in block form, of the memory and input/output controller of the system of FIG. 1.

Referring now to FIG. 2, the construction and operation of memory controller 10 according to the first embodiment, and in conjunction with CPU 5 and main memory 20, is now described in detail. As shown in FIG. 2, BIU 8 of CPU 5 communicates with memory controller 10 by way of address bus ABUS, data bus DBUS, and control bus CBUS, which are connected to specified terminals of CPU 5. The terminals of CPU 5 are its external connectors, which may be in the form of pins (as in pin-grid-array packages), solder balls, package leads, bond pads (when in chip form), or any other conventional type of external connection for integrated circuit packages. As known in the art, the terminals of CPU 5 are conventionally referred to by pin or signal names; for purposes of this description, bus lines connected to terminals of CPU 5 have the same name as their corresponding terminal. As shown in FIG. 2, control bus CBUS includes lines corresponding to terminals of CPU 5 including, in this example conventional Pentium-class microprocessor terminals such as memory/IO select M/IO#, cache request CACHE#, burst ready BRDY# and cache enable KEN#. Other conventional Pentium-class terminals used in performing memory accesses (but not shown in FIG. 2), include byte enable signals BE7#–BE0, address status signal ADS#, data/control select D/C#, write/read select W/R#, writeback/write-through signal WB/WT#, and the like. Clock generator 16 provides a clock signal on line CLK to CPU 5 (via BIU 8) and to memory controller 10.

Memory controller 10 includes several functional blocks for providing communication between CPU 5 and main memory 20. These blocks are shown functionally in FIG. 2, as it is contemplated that one of ordinary skill in the art will fully understand the construction and operation of memory controller 10 from a functional description. As is conventional in the art, address buffer 21 receives the memory address from CPU 5 on address bus ABUS, and forwards that memory address to address multiplexer 26 for presentation to main memory 20 on address lines AN through A0. Data buffer 23 in memory controller 10 similarly receives data from CPU 5 on data bus DBUS, and forwards that data, in write operations, to write buffer 27 which is in communication with main memory 20 via data lines $D_{in}$; this path is bidirectional, however, and as such write buffer 27 may receive data from main memory 20 on lines $D_{out}$, and forward this data to data buffer 23 for presentation to CPU 5 in memory read operations.

Control of communication between CPU 5 and main memory 20 is accomplished by bus control circuit 25, connected to control bus CBUS and memory control circuit 29; in addition, memory controller 10 also includes control logic 28, which controls the internal operation of memory controller 10. In particular, bus control circuit 25 receives control signals from CPU 5 on control bus CBUS, including signals M/IO# and CACHE# and, in response to a request for memory access, instructs memory control circuit 29 to issue the appropriate conventional DRAM control and timing signals to main memory 20 to accomplish the memory access, such signals including row address strobe (RAS#), column address strobe (CAS#), write enable (WE#). In addition, bus control circuit 25 issues control signals to CPU 5 indicating the status of the memory access, such control signals include cache enable signal KEN#, as well as burst ready signal BRDY#, which is of particular importance for burst accesses as is described below.

Control logic 28 of memory controller 10 also preferably includes programmable registers for controlling the operation of memory controller 10, including registers that define non-cacheable locations of main memory 20. In response to each memory access requested by CPU 5, control logic 28 examines these registers to determine whether the desired memory address, as presented on address bus ABUS, is in a non-cacheable area of the memory address space. As is known in the art, memory controller 10 asserts line KEN# to indicate to CPU 5 that the desired memory access is cacheable, and deasserts line KEN# if the desired memory address is in a non-cacheable area.

According to the prior art, as described above relative to the Background of the Invention, burstable memory accesses were available only for memory addresses that were not in a non-cacheable area. In prior art microprocessor implementations therefore, line KEN# would be deasserted responsive to a request for memory access made to a non-cacheable area; in addition, terminal BRDY# of the microprocessor would be asserted only for the duration of a single transfer operation (read or write) made to a non-cacheable area of memory, rather than for multiple bus cycles as would be the case for a burst access.

Figure 3:
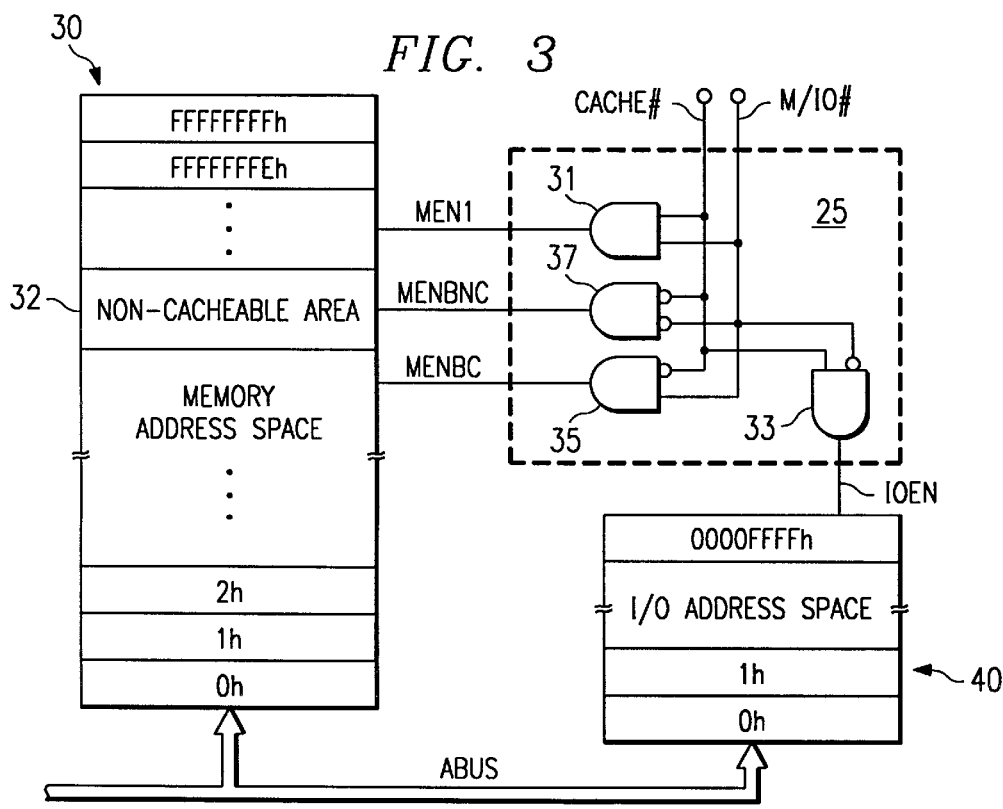
FIG. 3 is a schematic diagram of the memory address space and input/output address space of the data processing system of FIG. 1, schematically illustrating the conditions under which each address space is accessed.

FIG. 3 schematically illustrates the respective address spaces in system 2 according to this embodiment In exemplary system 2, as is conventional for Pentium-class microprocessors, a 4 Gbyte memory address space 30 (memory addresses from 0000 0000 h to FFFF FFFFh) and a 64 k byte I/O address space 40 (memory addresses from 0000 0000 h to 0000 FFFFh) are provided. Also as is typical for Pentium-class microprocessors, including CPU 5, memory address space 30 and I/O address space 40 share some of the same address values (i.e., address values between 0000 0000 h and 0000 FFFFh correspond to locations both in memory address space 30 and in I/O address space 40). As described above, conventional x86-architecture microprocessors present a control signal on a terminal referred to as M/IO#, which at a high logic level indicates that a memory access was to occur, and with a low logic level indicates that an I/O operation was to occur.

As shown in FIG. 3, memory address space 30 includes a non-cacheable area 32. Non-cacheable area 32 corresponds to a region of memory address space 30 that is blocked from being accessed by way of a cache write or a cache read, as described hereinabove. Cacheable access to non-cacheable areas is prevented by memory controller 10, particularly by its control logic 28, according to the contents of certain registers containing the addresses for which cacheable access is to be prevented. Non-cacheable area 32 may include video memory 20v (see FIG. 1), or memory-mapped control registers, neither of which are typically considered suitable for cache storage. As such, the contents of non-cacheable area 32 are prevented from being stored in internal caches within CPU 5, such as level 2 cache 6 shown in FIG. 1, through the operation of memory controller 10 and its issuance of a deasserted state on line KEN#.

However, it has been discovered by the present inventors that it may be useful to provide burst access capability to non-cacheable areas of main memory 20 in x86-architecture microprocessors. For example, CPU 5 may wish to rapidly access (i.e., in a burst mode) the contents of a portion of video memory 20v, in non-cacheable area 32. For example, CPU 5 may wish to copy the screen image into memory, or copy another portion of memory into video memory. Since video memory 20v is non-cacheable, prior art x86-architecture systems would prevent burstable access to non-cacheable area 32.

According to a first preferred embodiment, however, CPU 5 is able to request burstable but non-cacheable access to main memory 20, through the use of existing control signals in control bus CBUS. As indicated hereinabove, the control output signal M/IO# is used by conventional x86- architecture microprocessors to indicate whether a memory access (M/IO# high) or an I/O operation (M/IO# low) is to be performed. In contrast, according to this embodiment, the combination of a low logic level on line M/IO# in combination with assertion of the CACHE# signal (with a low logic level) is used by CPU 5 to request a burstable memory access to a non-cacheable area of memory address space 30. Memory controller 10, and specifically its bus control circuit 25, interprets this combination of M/I0# low and CACHE# low as a request for a burst memory access (rather than as an I/O request, as would be the interpretation according to the prior art), and performs a non-cacheable burst memory access to main memory 20 even if control logic 28 indicates that the memory address is within the non-cacheable area 32 of memory address space 30. If CPU 5 presents an address, in combination with M/I0# and CACHE# low, that is within the cacheable area of memory address space 30, a burst access is requested and performed; however, CPU 5 does not attempt to cache the access, even though cache access is available for the addressed memory location in this case.

Memory and I/O operations according to this embodiment may thus be requested by CPU 5, via control signals M/IO# and CACHE#, according to the following Table 1 and the corresponding logic in FIG. 3:

TABLE 1

| Operation type | M/IO# | CACHE# |
|---|---|---|
| Burstable, cacheable memory access | 1 | 0 |
| I/O operation (IN or OUT) | 0 | 1 |
| Nonburstable, noncacheable memory access | 1 | 1 |
| Burstable, non-cacheable memory access | 0 | 0 |

This operation is schematically illustrated in FIG. 3 by the portion of bus control circuit 25 used to drive control signals MEN1 for single memory transfer cycle (i.e., non-burstable, non-cacheable), MENBC for burstable, cacheable memory access, IOEN for I/O operation, and MENBNC for burstable, non-cacheable memory access. AND gate 31 drives line MEN1 high only in response to both of lines M/IO# and CACHE# high, AND gate 33 drives line IOEN high only in response to line M/IO# low with line CACHE# high, AND gate 35 drives line MENBC high only in response to line M/IO# high and line CACHE# low, and AND gate 37 drives line MENBNC high only in response to both of lines M/IO# and CACHE# low.

Of course, according to this embodiment, I/O controller 14 is configured to not respond to a low logic level on line M/IO# in combination with line CACHE# low, so as to prevent bus conflict due to a burstable non-cacheable memory access occurring simultaneously with an unintended I/O operation.

Figure 4A:
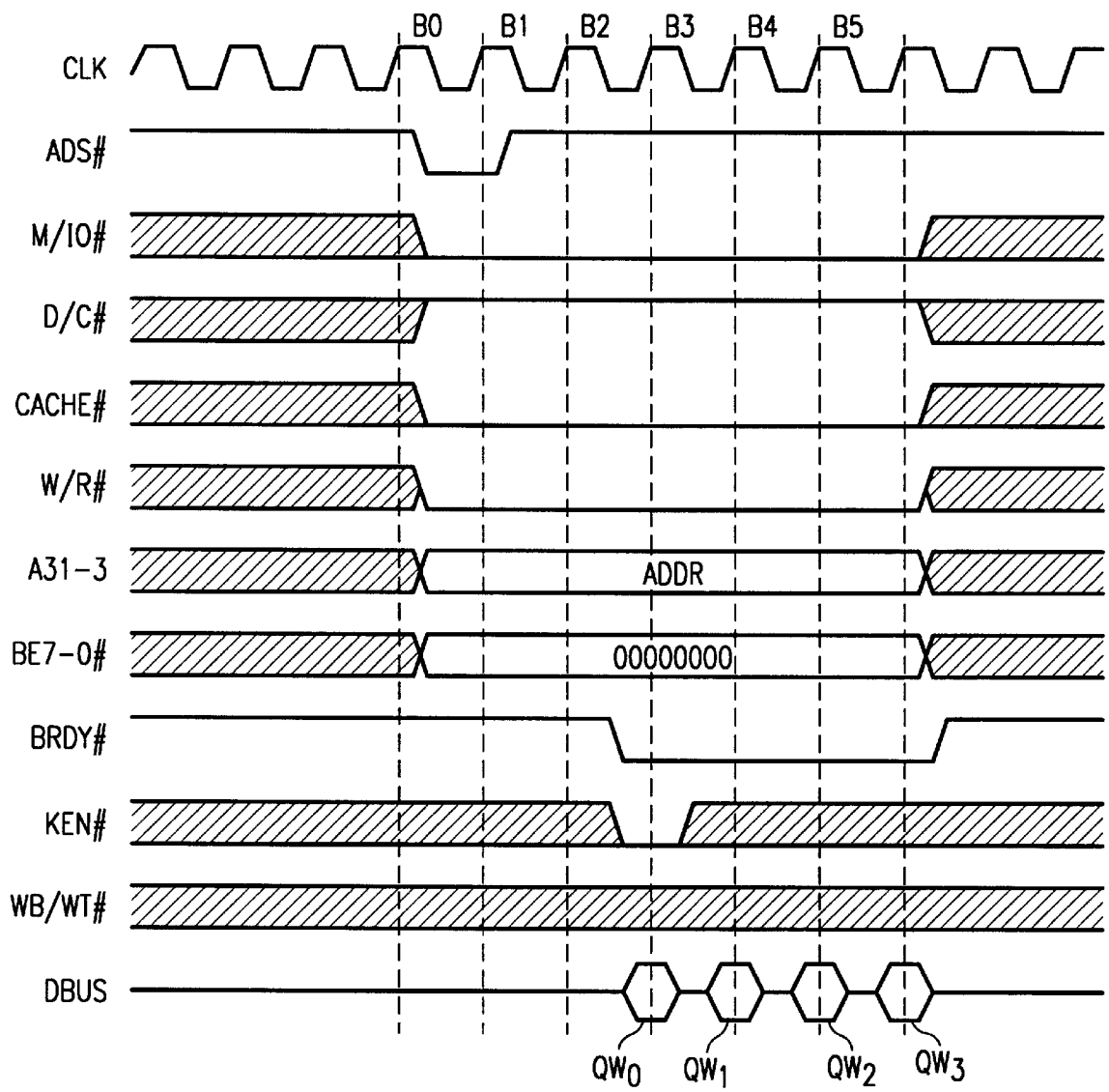
FIG. 4a is a timing diagram illustrating the request and performance of a burst read from non-cacheable memory according to the first embodiment.

Referring now to FIG. 4a, a timing diagram illustrating the operation of a burstable, non-cacheable memory read, as requested by CPU 5 and performed by main memory 20 and memory controller 10 according to this first preferred embodiment is now described, for purposes of further explanation. In this example, the read memory access is requested by CPU 5 issuing a memory address on address bus lines A31–A3 in combination with a 0 value on byte enable lines BE7#–BE0#; this address is indicated by CPU 5 as valid upon its assertion of a low logic level on line ADS#. In this example of a burstable non-cacheable memory read, the address presented by CPU 5 is within a non-cacheable area 32 of memory address space 30. In combination with the memory address, CPU 5 also issues a high logic level on line D/C# to indicate that this operation is a data operation, and asserts line W/R# low to request a memory read. These signals are conventional for x86-architecture microprocessor read operations. According to this first embodiment of the invention, CPU 5 also presents a low logic level on line M/IO# in combination with a low logic level on line CACHE#. These signals are all present in bus cycle B0 of FIG. 4a.

This combination of signals indicates to memory controller 10 that a burstable access to a non-cacheable area of main memory 20 is being requested. Memory controller 10 responds to this request by issuing the appropriate control signals and addresses to the addressed memory devices in main memory 20. In bus cycle B2 (bus cycle B1 being a wait state), memory controller 10 indicates to CPU 5 that a burstable access to main memory 20 has been granted by asserting line KEN# low, and that data bus DBUS will have valid memory data placed upon it at the end of the current clock cycle by asserting line BRDY# low. Line WB/WT# is a don't care in this operation, since the memory read is non-cacheable. Valid data, in the form of quad words QW0 through QW3 (each being 64 bits, or eight bytes), then appear upon data bus DBUS at the end of the current bus cycle B2 and the next three successive bus cycles B3 through B5 (assuming no wait states). The burst memory read according to this embodiment is then indicated as complete, by memory controller driving line BRDY# to a high state, in bus cycle B6. Subsequent memory accesses, of the burstable, non-cacheable type, or of another type, may then be performed in the conventional manner.

Figure 4B:
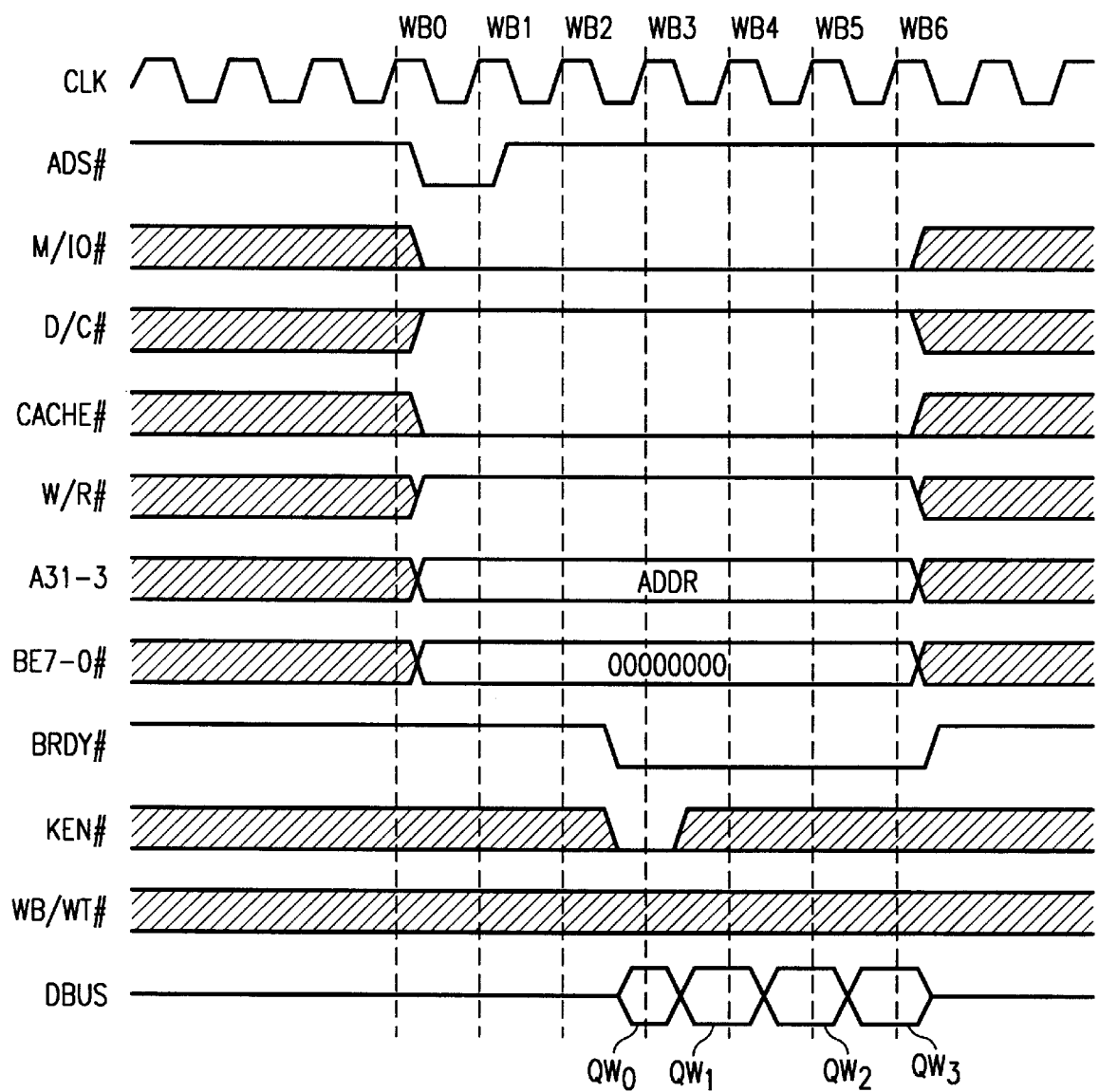
FIG. 4b is a tiding diagram illustrating the request and performance of a burst write from non-cacheable memory according to the first embodiment.

Referring now to FIG. 4b, the operation of a burstable, non-cacheable memory write operation is now described in detail. Similarly as in the case of the memory read of FIG. 4a, CPU 5 initiates the operation with the presentation of the desired address on address lines A31 through A3, and the zero value for byte enable bits BE#, together with a high level on line D/C# at the time that CPU 5 asserts the ADS# signal low in bus cycle WB0. Also in this cycle WB0, CPU 5 indicates that it wishes to perform a memory write by asserting line W/R# high, and requests a burst write to a non-cacheable memory location by asserting line M/IO# low in combination with line CACHE# low. Again, as in the case of the read, if the address points to a cacheable area of memory address space 30, a burst access is performed but the write is performed via cache. In response to this request by CPU 5, memory controller 10 issues (in bus cycle WB2, after a single wait state) a low logic level on line KEN# to indicate that burst access to main memory 20 has been granted, in combination with a low logic level on line BRDY# indicating that valid data is expected at the end of the current bus cycle WB2. CPU 5 then performs the write by placing valid data onto data bus DBUS at the end of bus cycle WB2 and the subsequent three bus cycles WB3 through WB5. The burst write operation is then indicated as complete by memory controller 10 driving line BRDY# in the final bus cycle WB6.

According to this embodiment, therefore, burstable access is provided to non-cacheable areas of main memory in an x86-architecture microprocessor-based computer system. The benefits of accomplishing memory operations at burst rates are thus obtained for a wider range of memory operations, particularly in accessing memory locations that are not suitable for cacheability such as video RAM locations. In addition, such access is provided according to this embodiment without requiring an additional pin on the microprocessor.

Figure 5:
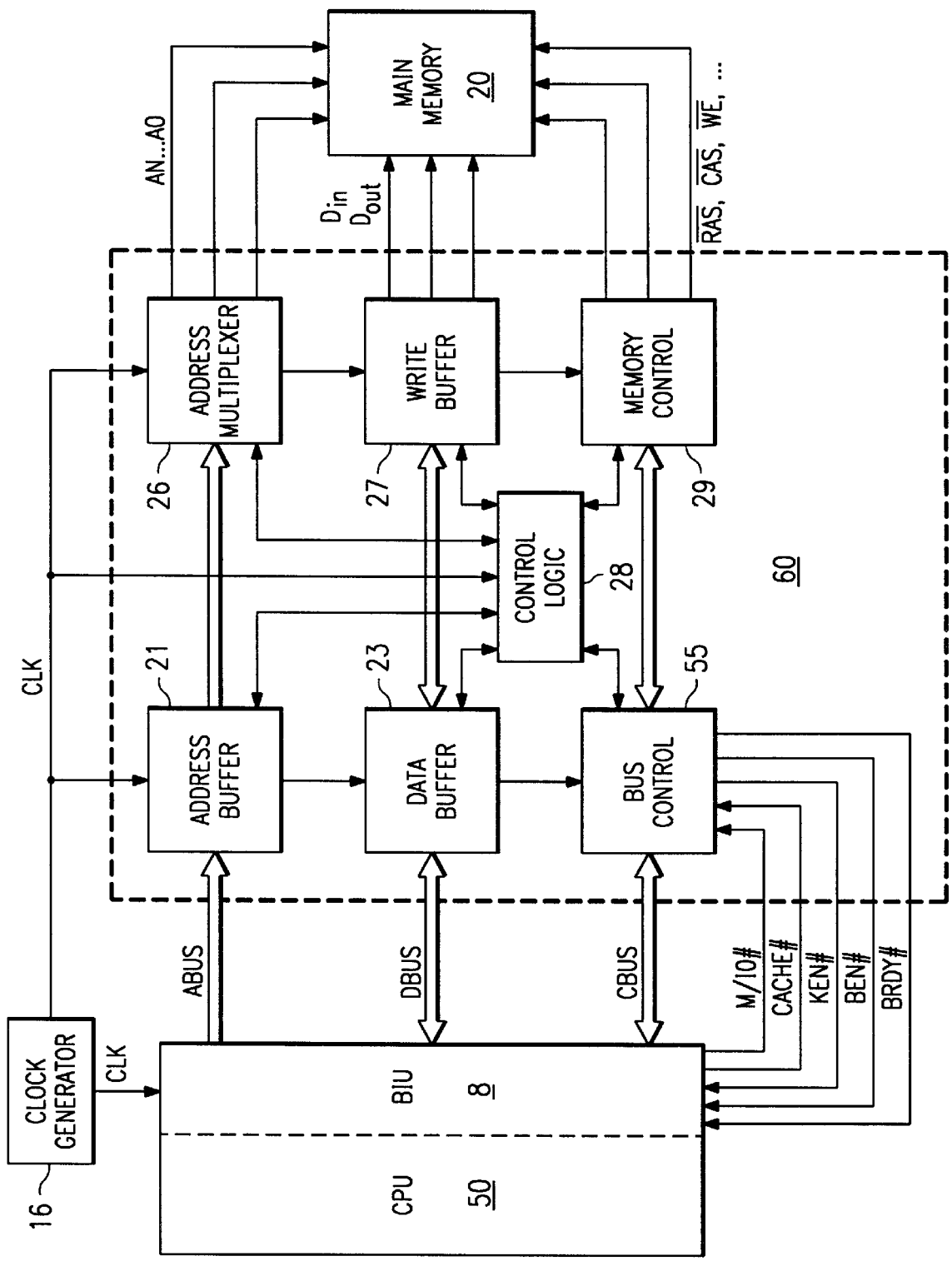
FIG. 5 is an electrical diagram of a second embodiment, in block form, of the memory and input/output controller of the system of FIG. 1.

If an additional microprocessor pin and corresponding mother board conductor are available, the various inventive aspects may be implemented according to a second embodiment, as is now described relative to FIG. 5. In FIG. 5, like reference numerals are used to refer to like elements as shown in FIG. 2.

FIG. 5 illustrates CPU 50, which is also a Pentium-class microprocessor as described above relative to FIG. 2, but which in this case is configured so that certain types of memory accesses imply a request for burstable access. These requests are communicated (either expressly or implicitly) to bus control logic 55 in memory controller 60, for interpretation as burst memory access requests.

For example, the execution of a block memory access operation by CPU 50, such as a REP MOV instruction, may set a control flag in BIU 8 that is communicated to bus control logic 55. In this event, once the control flag is set, bus control logic 55 may then interpret all subsequent memory access requests (line M/IO# high) as requests for burst access, for accesses both to cacheable and also non-cacheable areas of the memory address space. Alternatively, specific instructions may be executable by CPU 50 that explicitly refer to burst memory accesses both to cacheable and non-cacheable areas of memory; a flag or control signal would again be set by CPU 50 to indicate to memory controller 60 that a burst access is requested.

According to this second embodiment, because burst memory accesses may be requested by CPU 50 both to cacheable and non-cacheable areas of memory, separate indications of cacheability and burstability are preferably given by memory controller 60 to CPU 50. This is because CPU 50 may issue a implied burst access request while not knowing whether the memory address is in a cacheable area of the memory address space; even if the memory access is non-cacheable, burstable access will still be desirable. According to this embodiment, therefore, burst enable signal BEN# is provided, which is a signal and corresponding CPU terminal provided in this embodiment, in addition to the conventional Pentium-class control signals and pins. As shown in FIG. 5, according to this embodiment of the invention, bus control logic 55 issues a signal on line KEN# to indicate cacheability of the memory access (similarly as described hereinabove relative to the first embodiment of the invention), and also issues a signal on line BEN# to indicate whether or not burst access was granted. In the event that CPU 50 requested burst access to a non-cacheable memory location, line KEN# is maintained high by bus control logic 55 (indicating non-cacheable access) and line BEN# is driven low by bus control logic 55, indicating the grant of burstable access and thus instructing CPU 50 to either present or expect four quad-words of data on data bus DBUS.

Figure 6:
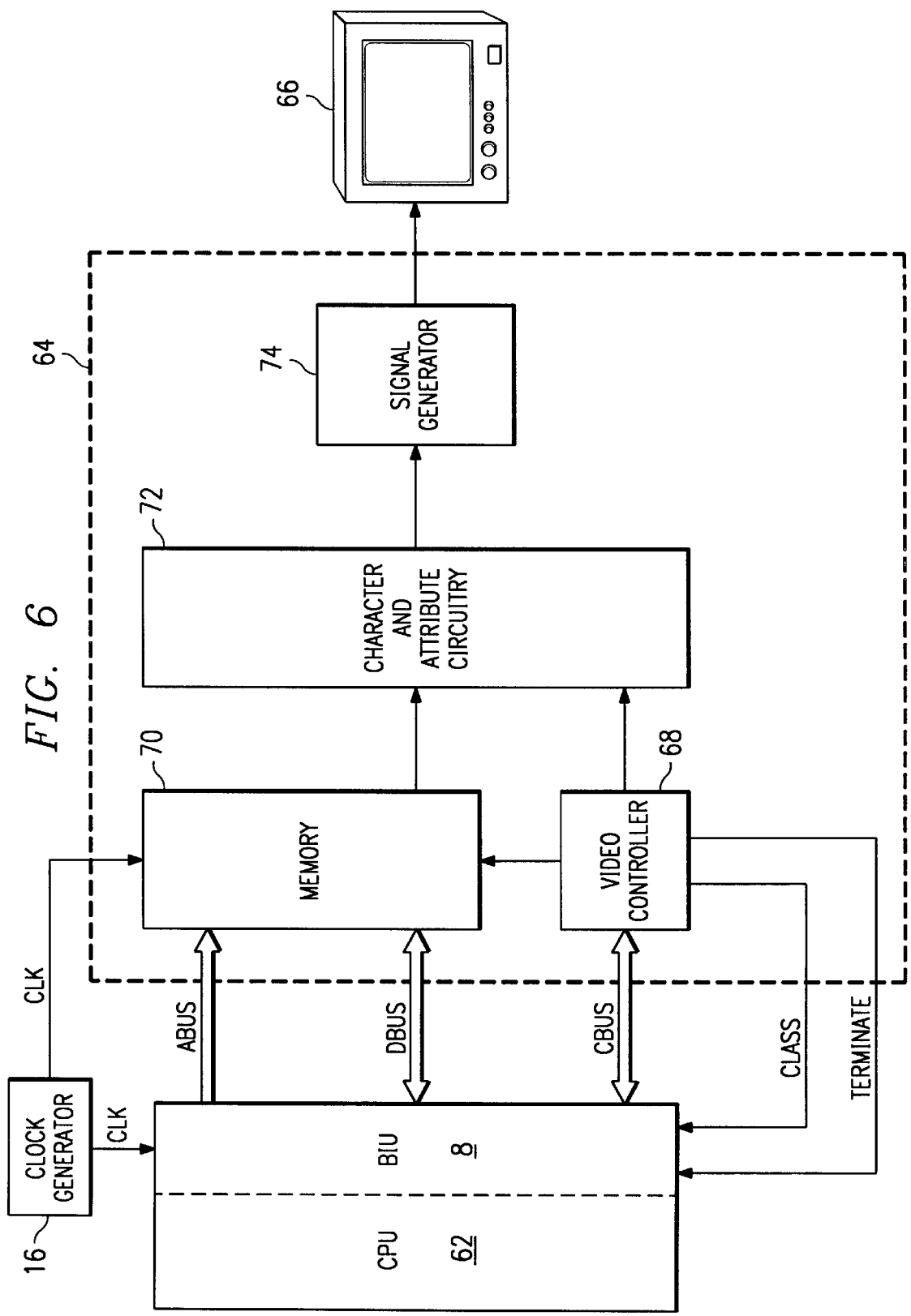
FIG. 6 is an electrical diagram of a third embodiment, in block form, of a microprocessor coupled to a screen display via a graphics adapter.

Having described various aspects of the present embodiments directed to non-cacheable data, the present inventors below provide still additional aspects directed to handling data traditionally treated as non-acheable (i.e., not permitted to be duplicated in one or more secondary stores such as cache storage), where the additional embodiments treat such data according to a classification structure such that the data nevertheless may be temporarily copied in a memory or other storage device (i.e., in a cache-like manner) despite the otherwise traditional restrictions which cause the data to be considered non-cacheable. In other words, under the following embodiments, a multiple copy is permitted of certain types, or "classes", of non-cacheable data, yet proper techniques are implemented to ensure that the additional potential copy does not interfere with proper memory coherency. To provide an example of such treatment, FIG. 6 illustrates still another embodiment of an inventive CPU configuration, which is provided by way of example to also introduce classes of data as that term is used for the remainder of this document.

Turning then to FIG. 6, once again it illustrates a CPU, here designated at 62 and which also includes a BIU 8 as described in connection with either CPU 5 or CPU 50 above. Thus, BIU 8 generally includes there buses to communicate externally from CPU 62, those being the ABUS, DBUS, and CBUS for addresses, data, and control, respectively. Note that each of these buses may operate in the manner described above, but for purposes of detailing the following embodiments only additional aspects of the CBUS need be discussed here. In this regard, note that CPU 62 includes two new signals as part of its CBUS signals where those signals relate to the treatment of non-cacheable data, and where those signals may be in addition to or in lieu of some of the CBUS signals discussed above. In any event, turning then to these signals they are designated as CLASS and TERMINATE. Each of these signals is discussed below.

The CLASS and TERMINATE signals are used in combination to permit what may otherwise may be considered non-cacheable data in the traditional sense to be stored in a cache-like manner for a limited period of time. More particularly, under the following embodiments, data of a desired type, as shown by way of examples below, may be assigned to a class, and this assignment is encoded in the CLASS signal on the CBUS. For example, the types of classes may pertain to video data, as may be appreciated by continuing with FIG. 6. Thus, CPU 62 is connected to a graphics adapter 64, and graphics adapter 64 is connected to output a drive signal to a screen display 66. With the exception of the capabilities of the CLASS and TERMINATE signals as described below, graphics adapter 64 may be one of many various configurations known to. one skilled in the art. Similarly, screen display 66 by itself also may be of various types, such as those including CRT devices or flat screen (e.g., LCD) devices as well.

Turning to the known aspects of graphics adapter 64, it includes a video controller 68 which may be various types of control or microprocessor devices used to implement video capability, and it further includes a memory 70 or some other type of data storage device which is mapped to the main memory space of CPU 62 for storing video data. Without the present embodiments, note that the data stored in MEMORY 70 is typically designated as non-cacheable because it may be subject to change independent of CPU 62, that is, it may be changed by video controller 68. As a secondary consideration, note also that video controller 68 does not support typical snooping as would be required if known caching techniques were permitted with respect to data stored in MEMORY 70. Graphics adapter 64 is also shown to include two additional blocks, those including character and attribute circuitry 72 and a signal generator 74. Note that these blocks may include additional distinct circuits so as to support the various functions typically implemented to accommodate either text and/or graphics data, and to sufficiently process data so that it may be serialized to signal generator 74 and presented as a meaningful drive signal such that the desired data is output by screen display 66.

Looking now to the CLASS and TERMINATE signals, note that they distinguish graphics adapter 64 (and CPU 62)

from the known art and provide additional functionality which, in this or other contexts, permits otherwise non-cacheable data to be temporarily copied into a storage circuit other than MEMORY 70. For the video data example of FIG. 6, assume for reasons more clear below that each group of data in MEMORY 70 corresponding to each different scanline is assigned to a different class. More specifically, scanlines are known in the art as corresponding to the number of horizontal traces across screen display 66. Therefore, for each such scanline, there is a corresponding group of data required to provide that scanline (i.e, a single horizontal trace) across screen display 66. For example, assume screen display 66 provides a total resolution of 1024 by 768 pixels, thereby indicating that a complete update of screen display 66 involves 768 horizontal traces. By definition, therefore, this indicates a total of 768 different scanlines of data in MEMORY 70. Given this data, for the current example of the present embodiment assume that each of these scanlines is attributed a CLASS number from 1 to 768.

Given the classification system described immediately above, a single scanline of data in MEMORY 70 may be identified according to its CLASS for use in conjunction with the TERMINATE signal to permit temporary duplication of that scanline data in a cache or cache-like structure. This operation is detailed below. For introductory purposes, however, an example of this functionality is now instructive. As stated above, in the prior art, the data in MEMORY 70 is non-cacheable and, therefore, the only copy of that data is located in MEMORY 70. However, the following embodiments define a "lifespan" for each CLASS of data, and during the live period of that lifespan the data in a given CLASS may be copied in a cache-like manner into a storage device other than MEMORY 70. The TERMINATE signal, when asserted, ends the lifespan for a stated data CLASS and therefore commands the additional storage device to respond in a manner detailed later. In other words, before the TERMINATE signal is asserted, the copy of this data may be used and/or changed by circuits having access to the other storage device. Therefore, in effect, the non-cacheable data is temporarily available to be used in a cache-like manner. These operations and benefits are better understood after the description of FIG. 7 following immediately below.

Figure 7:
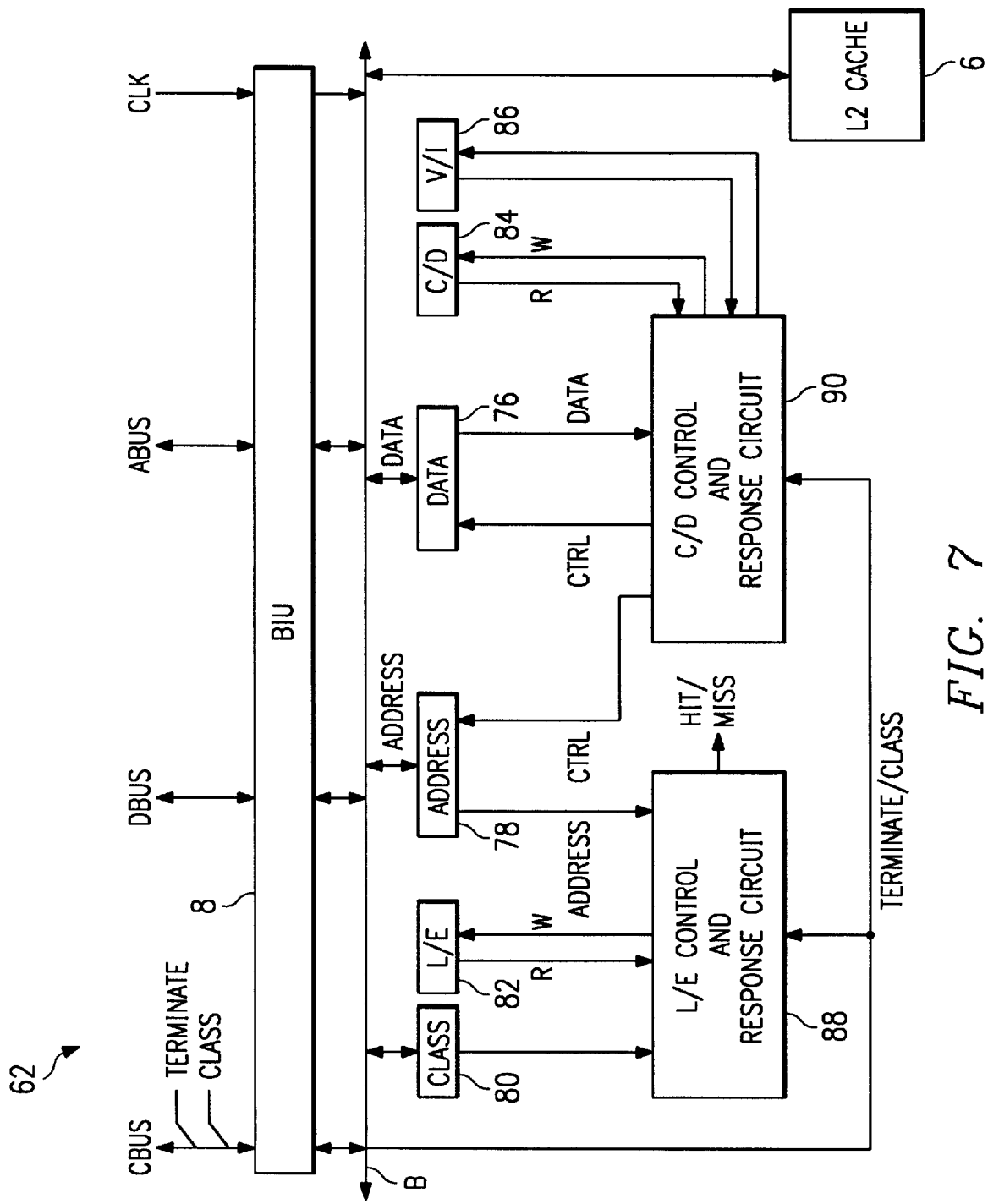
FIG. 7 is a schematic of a microprocessor embodiment for storing non-cacheable data and a class identifier corresponding to that data, where the non-cacheable data may be read and written by the microprocessor and modified during a life span as determined by assertion of a terminate signal and a corresponding class signal.

FIG. 7 illustrates a detailed schematic of CPU 62 of FIG. 6 and, therefore, is directed to a configuration where CPU 62 may temporarily store and modify non-cacheable data for a certain time period. Turning then to FIG. 7, it illustrates BIU 8 discussed above and, again, which is coupled to the three buses DBUS, ABUS, and CBUS, as well as receiving the CLK signal from clock generator circuit 16. Moreover, note in FIG. 7 that the CBUS includes the CLASS and TERMINATE signals introduced in FIG. 6, above. Additionally, below BIU 8 are numerous additional circuits which have not yet been discussed (other than L2 cache 6). Regarding these additional circuits, note first for purposes of simplicity that each of the DBUS, ABUS, and CBUS is shown connected, through BIU 8, to a common bus B. Thus, within microprocessor 5 it is intended that bus B may carry any of data, address, or control information. Bus B is connected to provide a DATA transaction unit to, or receive a DATA transaction unit from, a first register 76. In the present embodiment, the bus B transaction width for DATA is 8 bytes . Further, for purposes discussed below, in the preferred embodiment register 76 is sized to store up to one burst line of data; therefore, if the bus burst size is 32 bytes, then register 76 may store up to 32 data bytes. Note further, however, that in alternative embodiments register 76 may be larger or smaller than a single burst size of data. Bus B is further connected to provide an ADDRESS to, or receive an ADDRESS from, a second register 78, where that address corresponds to the DATA being read into, or written from, register 76. Lastly, bus B is connected to provide a CLASS identifier, if applicable, from the CBUS to a third register 80 which also corresponds to the DATA being read into, or written from, register 76.

Also associated with registers 76, 78, and 80 are preferably three indicators 82, 84, and 86. Indicator 82 indicates whether the DATA in register 76 is live or expired as those terms are understood below; therefore, indicator 82 is hereafter referred to as L/E indicator 82. Indicator 84 indicates whether the DATA in register 76 is clean or dirty and, therefore, hereafter is referred to as C/D indicator 84. The terms clean and dirty are used here in the same manner as in the cache art, thereby indicating whether DATA has been modified after being received in register 76. Moreover, recall from above that data register 76 is preferably sized to store 32 bytes of information. In alternative embodiments, therefore, C/D indictor 84 may be a single indicator for the entire set of DATA stored in register 76 or alternatively, may includes separate indications for each byte and, therefore, will include a total of 32 indicators, one for each of the 32 potential DATA bytes stored in register 76. Still further, C/D indictor 84 may include separate indications for other byte groupings, such as the bus transaction unit size of 8 bytes, or groups of 4 bytes or other groups as well. Indicator 86 indicates whether portions of the DATA are valid or invalid and, therefore, is referred to hereafter as a V/I indicator 86. Unless stated otherwise, the terms valid and invalid are also used in the manner of the cache art, that is, to indicate whether a given portion (e.g., a byte) of the DATA may be relied upon as valid information by a circuit reading that information. Again, recall from above that data register 76 is preferably sized to store 32 bytes of information. In this context, in the preferred embodiment, V/I indictor 86 preferably includes separate indications for each bus transaction size and, therefore, includes a total of four indicators, one for each of the 8 byte transaction units of DATA stored in register 76. However, as was the case for C/D indicator 84, in alternative embodiments indicator 86 may include separate indications for other byte groupings, such as groups of 4 by tes, individual bytes, or other groups as well. Each of indicators 82, 84, and 86 may be represented in various manners as known in the art, such as a bit in separate or common registers, a signal on a conductor, or a state in a state machine. The definition of the indications, that is live or expired, valid or invalid, and dirty or clean, is further demonstrated below with respect to the operation of the circuits of FIG. 7.

L/E indicator 82 is connected to a L/E control and response circuit 88. More particularly, in the preferred embodiment, L/E control and response circuit 88 may write the state to L/E indicator 82 and, thereafter, may read that same value for purposes explained below. In addition, L/E control and response circuit 88 is connected to receive the CLASS and TERMINATE signals from bus B. As detailed below, L/E control and response circuit 88 is operable to output a HIT/MISS signal which relates to the stored DATA, its CLASS, and its L/E indication. Lastly, note that L/E control and response circuit 88 may be constructed by a person skilled in the art using various known approaches given an understanding of its functionality and circuit relationships as discussed below.

The schematic of FIG. 7 further includes a C/D control and response circuit 90. More particularly, in the preferred embodiment, C/D control and response circuit 90 may write the state to C/D indicator 84 and V/I indicator 86, and thereafter it may read those same values for purposes explained below. In addition, C/D control and response circuit 90 may read the DATA in register 76, and also provide control signals to both registers 76 and 78 to cause, under circumstances described below, the DATA and ADDRESS of those registers to be written to bus B. Still further, C/D control and response circuit 90 is connected to receive the above-discussed CLASS signal from bus B. Lastly, note that C/D control and response circuit 90 may be constructed by a person skilled in the art using various known approaches given an understanding of its functionality and circuit relationships as discussed below.

Lastly, FIG. 7 further illustrates level 2 cache circuit 6. For reasons more clear below, level 2 cache circuit 6 is included to contrast the difference in storage techniques of the circuits of FIG. 7. Briefly, recall from above that main memory (e.g., see FIG. 3) may have storage space which is separated into cacheable and non-cacheable data. With respect to FIG. 7, portions of the cacheable data may be stored in level 2 cache circuit 6 (or some other cache structure). In contrast, portions of the non-cacheable data may be stored in data register 76. The techniques as well as the benefits from the latter storage are detailed below.

Figure 8:
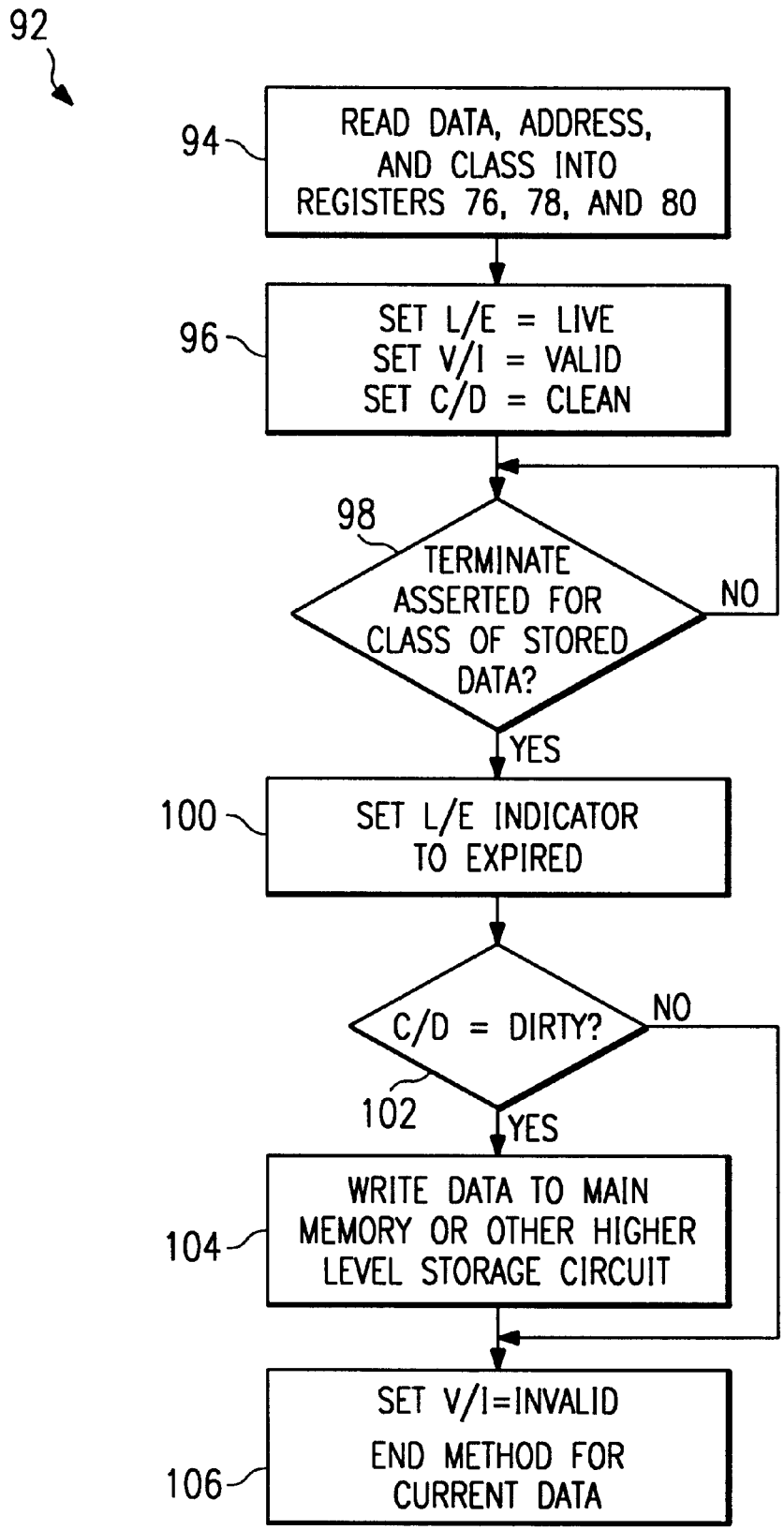
FIG. 8 is a flow chart of a method embodiment of operation of the schematic of FIG. 7.

FIG. 8 illustrates a flowchart of a method 92 of various operational steps of the circuits of FIG. 7. Before detailing those steps, note first that the order of various steps in method 92 is by way of example, and a person skilled in the art may readily alter such order while still taking advantage of various inventive aspects provided by the present circuitry. In addition, various of the steps in FIG. 8 also may be performed concurrently during a common clock cycle rather than sequentially, but a sequential flow is presented to simplify the present discussion.

Turning to FIG. 8, method 92 begins with step 94 where CPU 62 reads DATA into register 76, its corresponding ADDRESS into register 78, and its corresponding CLASS identifier into register 80. In the preferred embodiment, the DATA which is read is non-cacheable data. Various types of non-cacheable data which may be used with the present embodiments will be ascertainable by one skilled in the art. Indeed, FIG. 6 above introduced one such example, that is, data from a video memory (i.e., MEMORY 70). Still other examples are discussed later. In any event, as stated above, DATA register 76 is preferably sized to store up to a burst sequence of DATA. Thus, after step 94, register 76 stores all 32 bytes of DATA. Recall also in connection with FIG. 4a that an address was issued on bus lines A31–A3 to address the burst sequence of data. Because this address corresponds to the DATA, it is stored as the ADDRESS in register 78. Lastly, in accordance with the present embodiments, data stored in data register 76 will have a CLASS identifier assigned to it. Therefore, step 94 also reads this CLASS from bus B into register 80. Note also that although the above is described as preferable with a burst sequence of DATA, note further in an alternative operation that less than a burst of DATA may be stored in register 76 (or more than a burst if register 76 is larger than a single burst size). Thus, it is stated above that register 76 is operable to store up to one burst line of data, yet it clearly may store less than a burst such as a only a single unit of data (e.g., 8 bytes). Lastly, as further borne out below, note further that once the first DATA arrives in register 76, its lifespan has essentially commenced. Moreover, if this DATA arrives as a burst, the lifespan preferably begins upon receipt of the first part of the burst, such as the first eight bytes. The end of the lifespan is discussed later.

Step 96 initializes the values of indicators 82, 84, and 86. Again, although this step is shown in FIG. 8 as following step 94, this is done simply to separate the present discussion. Thus, the following actions may occur during the same clock cycle as step 94, with the indicators set in response to new DATA being received by register 76. Turning now to the indicators, L/E indicator 80 is initialized to indicate that the newly received DATA in register 76 is live, again as explained in greater detail below. Moreover, in a manner similar to the meanings in the cache art, C/D indicator 84 is initialized to indicate that the newly received DATA in register 76 is clean, and V/I indicator 86 is initialized to indicate that the newly received DATA in register 76 is valid. Note further that these settings may be accomplished by L/E control and response circuit 88 writing the new value to L/E indicator 82 and C/D control and response circuit 90 writing the new value to C/D indicator 84 and V/I indicator 86. Again, these two latter indications have the meaning typically used in the cache art Therefore, with respect to C/D indicator 84, a clean indication represents that DATA in register 76 has been unchanged since it was read into register 76; conversely, an indication that the DATA is dirty represents that it has been changed since it was read into register 76 and, therefore, for coherency purposes, is the most current form of that DATA (i.e., the line of DATA acts in a "write back" manner as known in the art). With respect to V/I indicator 86, a valid indication represents that the DATA in register 76 may be read by circuits having access to that DATA; conversely, the same DATA should not be read if marked invalid.

Step 98 demonstrates a waiting period during which the DATA in register 76 may be used in a cache-like manner, and again may occur in parallel operation to steps 94 and 96, above. Specifically, step 98 determines whether the CLASS of DATA stored in register 76 has been terminated. More specifically, note now that upon assertion of the TERMINATE signal, L/E control and response circuit 88 compares the CLASS signal on bus B to the CLASS identifier stored in register 80. If a match in the CLASS signals occurs, then according to the present embodiments the DATA in register should no longer be used by other circuits having access to that DATA and method 92 continues to step 100. On the other hand, if either the TERMINATE signal has not yet been asserted, or it has been asserted but the CLASS signal on bus B does not match the CLASS identifier stored in CLASS register 80, then step 98 continues to await satisfaction of these conditions before advancing method 92. Therefore, note that during step 98, the copy of the DATA in register 76 is live (as indicated by its L/E indicator). Consequently, until that indication changes, then any circuit having access to the DATA may read and/or write to it (of course, provided the DATA is also marked valid). Note, therefore, that during the pendency of step 98 the DATA which otherwise is usually considered non-cacheable may be used in a cache-like sense, that is, a copy of the DATA has been duplicated from the original version as it existed in a non-cache (e.g., MEMORY 70), and that copy is readily accessible to circuitry within CPU 62 to either read or update that DATA without that same circuitry having to perform an off-chip access to the original copy of the DATA (e.g., to MEMORY 70).

Step 100, having been reached once the TERMINATE signal is asserted and detected, and the then-stated CLASS signal on bus B matches the CLASS identifier in register 80, changes the state of L/E indicator 82 from live to expired. Again, this operation may be accomplished by L/E control and response circuit 88 writing the new value to L/E indicator 82. Given the operation thus far, it is again clear that between steps 96 and 100 the storage of the DATA and ADDRESS provides a cache-like storage for what is otherwise non-cacheable data. Specifically, before the condition of step 98 is satisfied, indicator 82 indicates that the DATA is live. This indication indicates to any requesting circuit that it is permissible during the live status to either read or write the DATA in register 76. Of course, this indication is also to be viewed in light of the two other indicators 84 and 86. For example, assume that an entire burst of DATA is stored in register 76 (i.e., indicator 86 indicates valid), that the CLASS of the stored DATA has not been terminated, (i.e., indicator 82 indicates live), and the DATA has not been modified since it was received (i.e., indicator 84 indicates clean). Thus, like a cache configuration, an address placed on bus B and seeking to read corresponding data may address the DATA in register 76. More specifically, such an address is received by L/E control and response circuit 88. Circuit 88 then determines if the address on bus B matches the ADDRESS in register 76 and whether the DATA is live and valid; if these conditions are met then circuit 88 issues a HIT in the manner of a cache circuit. Thus, in response to the HIT signal, the circuit which issued the ADDRESS may then read the DATA from register 76. Moreover, in a similar regard, note also that a snoop address also may be received by circuit 88 in a like manner. As known in the art, snooping permits cache structures to maintain proper memory coherency. In the present embodiment, however, recall it is generally non-cacheable data which is stored in register 76. Nevertheless, as pointed out with respect to step 98, above, the DATA in register 76 is actually comparable to cached data during the waiting period of step 98; consequently, again to ensure proper memory coherency (i.e., to preserve data consistency among different copies of data attributed to a common address in main memory), this DATA also may be snooped, as is accomplished by having circuit 88 receive a snoop address as mentioned above. Again, therefore, circuit 88 may compare the snoop address to the ADDRESS in register 76, and issue a HIT if the corresponding DATA is live and valid. Still further, if the snoop request further requests a cast out operation, the corresponding DATA may then be written to bus B as well and, therefore, be available in response to the snoop. In this event, C/D indicator 84 also would be set to clean since the copy of DATA in register 76 is therefore no longer the only copy of that information. As yet another example, the snoop request may, in addition to requesting a cast out of the DATA, also may request an invalidate. Thus, in addition to outputting the DATA, V/I indicator 86 would be set to invalid. Indeed, note further under the present embodiment that in response to a snoop which causes an invalidate then V/I indicator 86 also may be set to expired because otherwise the data would be live but invalid which may not provide a useful state. These as well as other snoop techniques may therefore be included, and such techniques are known in the art such as demonstrated by Section 8.3 of the text "Computer Architecture A Quantitative Approach", second edition, by Hennessy and Patterson, 1996, publisher Morgan Kaufmann Publishers, Inc., where that section is entitled "Centralized Shared-Memory Architectures," and which is hereby incorporated herein by reference.

In addition to the above, due to the described cache-like operation, note further that while the DATA in register 76 is live, it also may be modified again in a manner similar to the cache art. Thus, if an address seeking to write information is placed on bus B, circuit 88 again determines whether that address matches the ADDRESS in register 78 and, if so, further determines whether the DATA in register 76 is live. If so, the DATA in register 76 may be modified. Moreover, in such an event, circuit 90 detects the change to the DATA and changes the state of C/D indicator 84 from clean to dirty. These as well as other cache-like operations also may be included with the present embodiments, and again are ascertainable from various references, such as the above-cited and incorporated by reference text entitled "Computer Architecture A Quantitative Approach".

While the immediately two preceding paragraphs described a cache-like operation for selected circuits of FIG. 7, it is now straightforward to appreciate the concept of the "life span" of the DATA in register 76 as ultimately defined by the assertion of the TERMINATE signal for the given CLASS of DATA. Specifically, during step 100, the DATA is marked expired and, therefore, after that action circuit 88 will always indicate a miss for that DATA. In other words, even if an address (either a bus address for a read or write from bus B, or a snoop address) is issued to circuit 88 and matches the address in register 78, circuit 88 will detect that the DATA is expired because the conditions of step 98 have previously been met (i.e., TERMINATE was asserted as to DATA of the CLASS set forth in register 80). Thus, only during the "life span" between the initial loading of the DATA into register 76 up to its termination is the DATA available in a cache-like manner. Note further, however, that this operation is only stated to be cache-like due to those of its operations which are similar to those of typical cache structures. However, because the DATA is by definition non-cacheable (as indicated from the main memory or other memory which is mapped to main memory space), it is not presented to another non-class identifying cache structure such as level 2 cache 6 or other caches within or external from CPU 62.

Turning next to step 102, it determines whether C/D indicator 84 is clean or dirty as corresponding to valid DATA. If the indicator states the DATA in register 76 is clean (and which is also valid), method 92 continues to step 106. On the other hand, if C/D indicator 84 indicates that the DATA in register 76 is dirty, then the method continues to step 104.

During step 104 circuit 90 issues appropriate control signals so that the DATA in register 76 is written to main memory (or some other higher level storage structure such as the graphics adapter memory), according to the ADDRESS stored in register 78, thereby ensuring proper memory coherency. Moreover, note further that the CPU 62 preferably further includes sufficient wait causing circuitry during the period from step 100 to step 104 when dirty DATA is not yet written back to main memory. hi other words, assume that step 102 identifies dirty data and step 104 therefore commences writing that data to main memory, but assume further that during the write operation(s) there is a request to read that same data. As one approach, the circuit performing the read may be made to wait until the DATA is written to the main memory, and then that circuit reads the DATA from the main memory. As another approach, the circuit performing the read may read the DATA from the bus as that DATA is being written to the main memory.

Returning briefly to step 102, note further that it may be changed or eliminated in alternative embodiments. For example, while method 92 illustrates that dirty DATA is written to main memory only after the DATA is terminated in response to the assertion of the TERMINATE and appropriate CLASS signals, note further that C/D control and response circuit 90 also may periodically take this action even before termination occurs. In other words, circuit 90 may be configured to evaluate the C/D indicator 84 at some periodic interval regardless of whether TERMINATE has been asserted and, if the DATA is dirty, issue appropriate control signals to cause the DATA to be written to a main memory. Thus, periodic updates could be made to a main memory based on some consideration other than termination. As another example of a modification to the above, the notion of writing dirty information back to a higher storage arises in the context of what is referred to in the art as a writeback approach, that is, an approach where data is initially written to a cache (or cache-like) structure, and is later output to update a higher level memory structure. In an alternative embodiment, therefore, the known write through methodology may be used. In such an event, each time a modification is made to already-stored DATA in register 76, it is also written to a main memory (e.g., MEMORY 70 in the example of FIG. 6). In such an event, there is no need to have a dirty versus clean indicator because, by definition, the DATA is always clean (because it is always a copy of the same information available in a higher level memory). Indeed, given the alternative of writeback and write through, still another approach of the present embodiment is to make the choice dynamically alterable. For example, an enable signal could be used. In such an event, when the signal is in a first state, DATA is written in a writeback manner, thereby requiring maintenance of, and adherence to the representation of, C/D indicator 84 with respect to that DATA. Conversely, when the signal is in a second state, DATA is written in a write through manner, thereby eliminating the need to maintain or respond to the representation of C/D indicator 84 with respect to that DATA. Lastly, once a proper technique is used to ensure memory coherency due to a modification of the DATA in register 76, method 92 continues to step 106.

Step 106 merely indicates an end to the flow for the particular instance of DATA and its corresponding ADDRESS. Thus, the DATA is marked as invalid as it is now expired and, again, a valid and expired status may not be useful. Next, after step 106, method 92 may repeat with respect to different non-cacheable DATA written to register 76, and then repeat the steps of method 92 in the manner described above.

Having completed the discussion of FIG. 7, it is instructive to now return to FIG. 6 to demonstrate how the steps of FIG. 7 may be implemented in the example of video data stored in MEMORY 70 and, therefore, to demonstrate the operation of the CLASS and TERMINATE signals. Thus, suppose now that the scanlines for screen display 66 are classified as incrementing from top to bottom of the screen. In other words, suppose that the data in MEMORY 70 corresponding to the uppermost line on screen display 66 has a corresponding CLASS identifier of 1, while the data in MEMORY 70 corresponding to the lowermost line on screen display 66 has a corresponding CLASS identifier of 768, with each CLASS identifier ascending down the screen between CLASS 1 and CLASS 768. Next, assume that MEMORY 70 at a first instance stores all data corresponding to all 768 scanlines. Using the present embodiment, therefore, while the uppermost scanline is being traced across screen display 66, the next successive scanline (i.e., CLASS 2) may be stored as DATA in register 76 (i.e., as an example of step 94), which also therefore stores the identifier value of 2 in CLASS register 80, and initializes the indicators corresponding to the stored DATA. Thus, at this point, any circuit having access to register 76 may use or modify the stored data (i.e., the second scanline) because it is live, clean, and valid. Next, assume that the top scanline across screen display 66 is complete. At this time, and as is known in the art, video controller 68 asserts a horizontal synchronization signal. Thus, it is known that very soon in the near future the second scanline will be traced. Therefore, in accordance with the present embodiments, the TERMINATE signal may be the same as, or triggered by, the horizontal synchronization signal Given this signal, at the same time TERMINATE is asserted, video controller 68 asserts to CPU 62 the value of CLASS 2 as the value for the CLASS signal. In response, step 98 will detect the match of the CLASS signal to the CLASS identifier stored in register 80, thereby changing L/E indicator 82 to expired and causing the stored data, if dirty, to be written out to MEMORY 70. Therefore, when the next horizontal trace across screen display 66 occurs, it may occur using the data in MEMORY 70 which has now been output from DATA register 76. Given this example, therefore, one skilled in the art will appreciate that the non-cacheable video data has, in essence, been available for cache-like use during a lifespan which ends in response to the horizontal synchronization signal. Indeed, this process may repeat for each scanline so that while a scanline is being traced across screen display 66, the next successive line is stored in DATA register 76 and is live for cache-like availability. Note also that the above timing is only by way of example and other alternatives may be used as well. For example, when the first scanline is complete, the TERMINATE signal may be issued along with a CLASS signal corresponding to the third scanline as well. Thus, the DATA, if any, stored in DATA register 76 and corresponding to that third scanline also would be render expired and, thereafter unavailable for cache like use (as well as being output to memory 70 provided that DATA is dirty). Numerous other examples will be ascertainable by one skilled in the art.

Given the above, note further that DATA may be used with present embodiments and terminated in contexts other than the horizonal synchronization signal described above. For example, also in the area of video data, it is known that video controller 68 will also provide a vertical synchronization signal when the lowest horizontal scanline across screen display 66 is complete. Thus, the TERMINATE signal could be responsive to this vertical synchronization signal, that is, the TERMINATE signal may be the same as, or triggered by, the assertion of the vertical synchronization signal. Indeed, note further that the present embodiments may apply to data other than video data. For example, various other memory locations in a main memory location may include data pertaining to the status of an I/O device where that data is typically non-cacheable, yet that data may be temporarily stored in a manner consistent with the present embodiments. Given that situation, a copy of such data could be stored and assigned a CLASS identifier as corresponding to the particular I/O device. Therefore, when it is desired that the data be available to the I/O device from a main memory, a signal from the I/O device could be used to trigger the TERMINATE signal while also asserting the designated CLASS identifier, thereby causing the main memory to update and making the correct DATA then available to the I/O device. As an I/O example, a disk controller often includes a disk data buffer, where that buffer is filled with data which, either during the filling process or once the buffer is full, is written to the disk in the corresponding disk drive (the buffer also may receive data from the disk to be written out, such as to main memory). In this regard, a control signal may be output by the disk controller, whereby that control signal is asserted when the buffer reaches a certain empty status (i.e., when a certain portion of the buffer is empty and ready to be filled with more data). Given such a control signal, under the present embodiments it is then used to trigger the TERMINATE signal while a CLASS identifier is concurrently provided (such as by the disk controller). More specifically, when data is being written from the disk data buffer to the disk and the buffer reaches a certain status of less than full, the control signal would be asserted, thereby asserting TERMINATE. At the same time, the CLASS identifier would indicate a group of data to be written to the buffer. Consequently, in response, the data necessary to fill the buffer would be updated from register 76 to the main memory, and thus would also be available to the disk data buffer. Still other examples may be ascertained by one skilled in the art.

Figure 9:
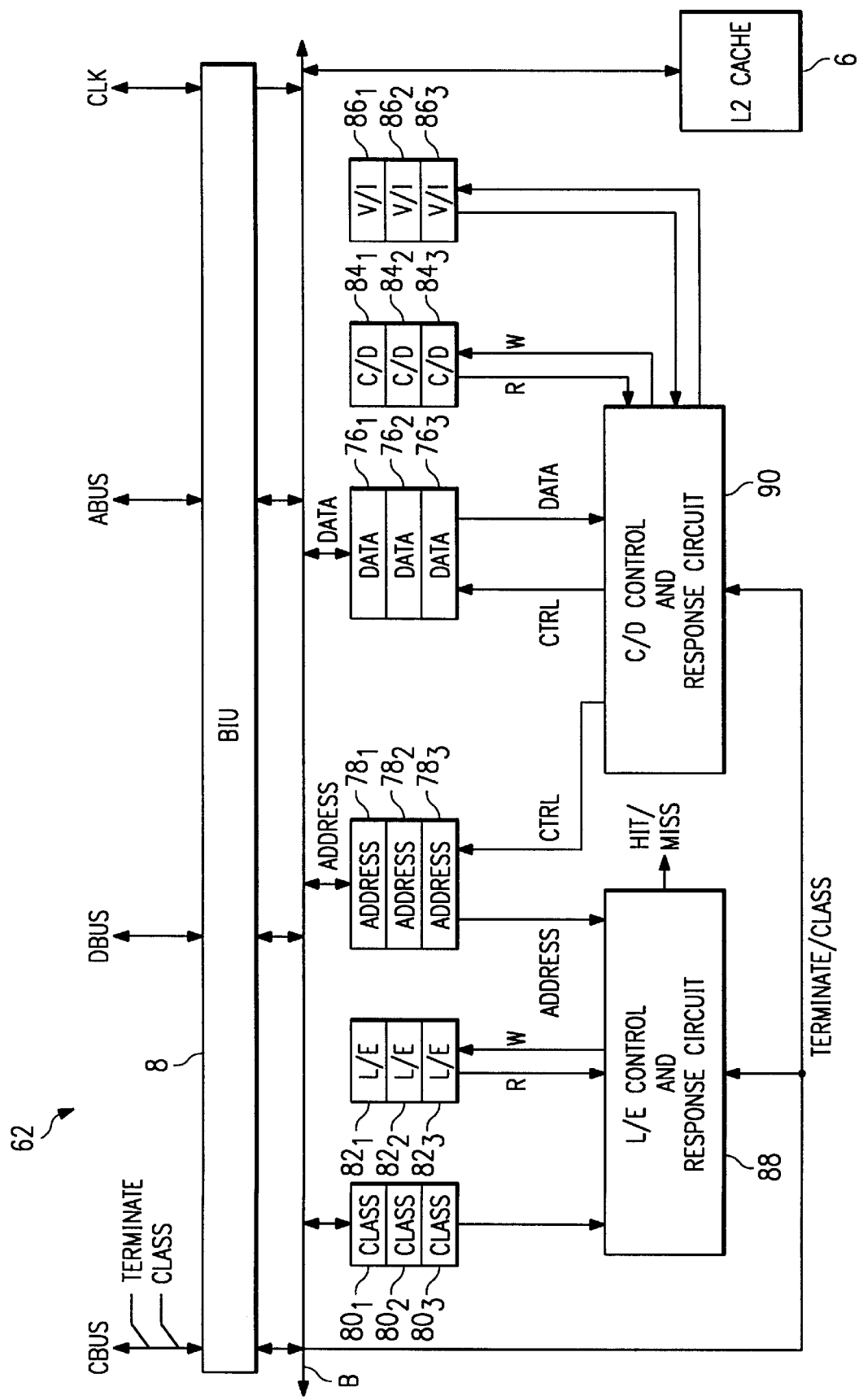
FIG. 9 is a schematic of a microprocessor embodiment for storing a plurality of lines of non-cacheable data where each line has a class identifier corresponding to the data of that line, and where each line may be read and written by the microprocessor and modified during a life span as determined by assertion of a terminate signal and a corresponding class signal.

FIG. 9 illustrates an alternative embodiment to FIG. 7 where many of the same concepts are carried forward yet are duplicated to store numerous independent sets of DATA and ADDRESSES. Thus, to simplify the common aspects of FIGS. 7 and 9, like reference numerals are carried forward in most instances, but subscripts are added or reference numbers are changed to distinguish those changed features, each of which is discussed below.

The implementation of FIG. 9 allows storage of three different lines of DATA in corresponding registers $76_1$, $76_2$, and $76_3$. Each of these lines is again preferably operable to store up to one burst line of data (e.g., 32 bytes). Moreover, each line of DATA has a corresponding ADDRESS stored in a respective register $78_1$, $78_2$, and $78_3$. Still further, note that each of these lines also has a corresponding CLASS register $80_1$, $80_2$, and $80_3$. Indeed, note that where multiple storage units are used such as depicted in FIG. 9, one approach is to use existing microprocessor storage circuits. For example, often a microprocessor includes a prefetch buffer which includes the capability to store lines of data and corresponding addresses. Thus, one technique for implementing the multiple data and address registers of FIG. 9 is to share the prefetch buffer responsibility with the operation described in this document. In other words, an enable signal could be associated with each storage line. When the enable signal is in a first state, the line operates according to the predetermined prefetch function of the microprocessor. However, when the enable signal is in a second state, the line operates according to the present embodiments. For more information about an inventive prefetch buffer arrangement, the reader is invited to review U.S. Provisional Patent Application Number 60/024,860, entitled "Microprocessor Circuit, Systems, And Methods Using A Combined Writeback Queue And Victim Cache", filed Aug. 28,1996, upon which U.S. patent application Ser. No. 08/919,732 claims priority, now U.S. Pat. No. 6,035,654 issued Mar. 14, 2000, which is hereby incorporated herein by reference.

Returning to each line of information provided by FIG. 9 in the sense of the present embodiments, each such line further includes a corresponding L/E indicator $82_1$, $82_2$, and $82_3$, a corresponding C/D indicator $84_1$, $84_2$, and $84_3$, and a corresponding V/I indicator 861, 862, and 863. Each of the above registers and indicators are again connected to control circuits, those including L/E control and response circuit 88 and C/D control and response circuit 90. In this instance, however, circuits 88 and 90 include additional hardware to accommodate the plurality of independent data lines as well as their corresponding ADDRESS and CLASS registers. Lastly, note that the TERMINATE and CLASS signals are connected to both L/E control and response circuit 88 and C/D control and response circuit 90 and, therefore, each line corresponding to a terminated CLASS may be identified and output to main memory as better appreciated below.

The operation of the circuit of FIG. 9 is generally the same as method 92 of FIG. 8 discussed above. However, the same steps set forth above with respect to method 92 are preferably independently carried out with respect to each different line (i.e., DATA, as well as its corresponding ADDRESS, CLASS identifier, indicators, and the TERMINATE and CLASS signals). Thus, the reader is first referred to the above discussion of FIG. 8 for an extensive description. At this point, one skilled in the art will appreciate that, for each line of DATA and corresponding ADDRESS, a life span is associated with that line due to the corresponding CLASS, and during the life span the DATA may be read or written and memory coherency is ensured either during or at the end of that life span. However, note now the effect of multiple lines sharing the same CLASS. More specifically, the example of FIG. 9 includes three separate lines to store the above-discussed information (i.e., DATA, CLASS, ADDRESS, and indicators). Now, suppose by way of example that the top and bottom lines in FIG. 9 have an identifier value of 3 in their CLASS registers, while the middle line has an identifier value of 2 in its CLASS register. Next, note that when the TERMINATE signal is asserted, L/E control and response circuit 88 determines whether the contemporaneously asserted CLASS signal matches that in any one or more of the CLASS registers. For example, assume TERMINATE is asserted and the CLASS signal then on bus B indicates a value of 3. Therefore, L/E control and response circuit 88 finds a match in both the top and bottom lines of information in FIG. 9. In response, L/E control and response circuit 88 will set L/E indicators $82_1$, and $82_3$ to expired, will indicator $82_2$ will remain set to live. Moreover, also in response, C/D control and response circuit 90 will then operate with respect to the top and bottom lines of DATA as discussed above. In other words, if that DATA is dirty, it is output to a higher memory to ensure proper coherency.

Figure 10:
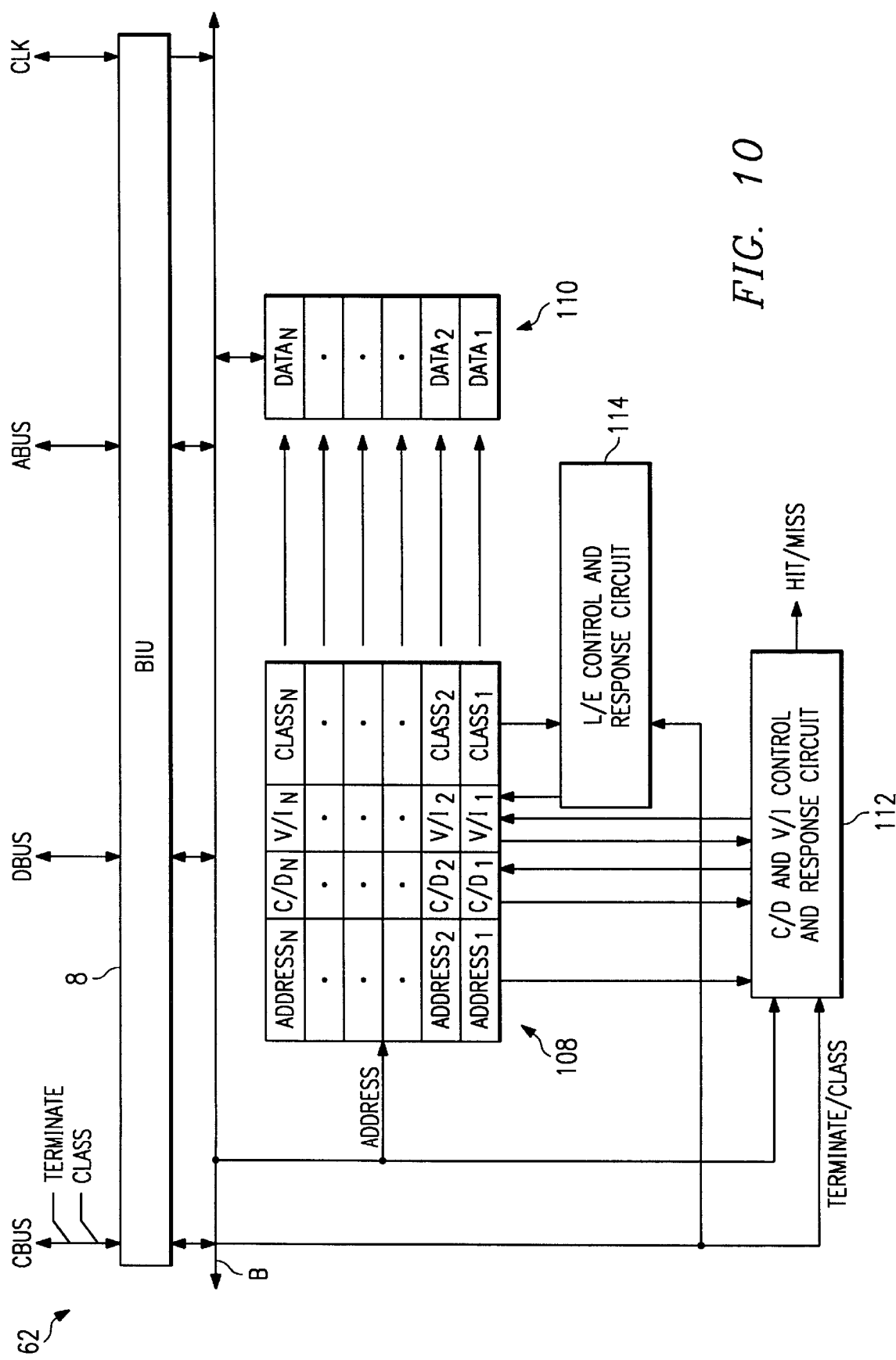
FIG. 10 is a schematic of a microprocessor embodiment for storing a plurality of lines of data and corresponding class identifiers, where some of the lines are governed by known cache policies while others may be read and written by the microprocessor and modified during a life span as determined by assertion of a terminate signal.

Given the example provided in the immediately preceding paragraph, one skilled in the art will appreciate that the present embodiments may be further modified to include any number of lines in the storage structure, where each of those lines is also capable of associating a CLASS to the DATA stored in a line. Given this capability, a single CLASS identifier, when evaluated in response to the assertion of the TERMINATE signal, may cause various different lines of DATA to be output by the storage structure to a higher memory. Note therefore that the present embodiments may be distinguished in various manners to the outputting of data from a typical cache. For example, in a typical cache, only one cache line is identified as requiring output to a higher memory. In contrast, in the present embodiments, if DATA in more than one line is associated with the same CLASS identifier, then each of those lines are identified as required for output (if the data is dirty) by the single assertion of the TERMINATE and CLASS signals. As another example, in a typical cache a request directed to the cache is made by presenting the cache with an address, and from that address it is known that the addressed data and perhaps some data contiguous to that data (i.e., commonly the surrounding data in the same cache line as the addressed data) is to be affected by the request. In contrast, in the present embodiments, an explicit address is not provided in the request to the storage structure to output dirty DATA. Still further, also in the present embodiments, a single CLASS identifier may affect DATA which is in various lines in the storage structure, and which therefore does not necessarily reflect data stored in contiguous memory locations. Still other differences and benefits will be appreciated by one skilled in the art FIG. 10 illustrates an alternative embodiment to FIG. 9 where various of the above-discussed concepts are carried forward with additional modifications within the inventive scope. Thus, again there is designated generally a microprocessor 62 having a BIU 8 receiving three external bus signals (i.e., DBUS, ABUS, and CBUS) as well as a CLK signal. Again for simplicity each of the DBUS, ABUS, and CBUS is shown connected through BIU 8 to a common bus B. As an introductory matter, note that the embodiment of FIG. 10 demonstrates how various of the present inventive concepts may be further combined by modifying an existing cache structure. For example, the circuits shown below bus B in FIG. 10 may be included with, or associated with, a cache structure such as L2 cache 6 shown in various of the above Figures. By associating the present embodiment with an existing cache, design complexity is minimized with such an approach, as may be the data path since a separate data path need not be constructed to a structure which is completely independent of an existing cache. Given this introduction, the discussion below describes the various circuits and well as their relationship to both the present embodiments as well as current cache structures.

The circuits of FIG. 10 include a tag memory 108 and as associated data memory 110. In general, the association of a tag memory and data memory is known in the art, whereby the tag memory stores information regarding a corresponding entry in the data memory. Tag memory 108 and data memory 110 have a corresponding number of rows, illustrated as an integer N in FIG. 10. With respect to tag memory 108, each of its rows includes three portions as known in the art and may include other as well. With respect to the three known portions shown, tag memory 108 includes an ADDRESS of the corresponding data in data memory 110, an indicator of whether the corresponding data is clean or dirty (i.e., shown as a C/D indicator), and an indicator of whether the corresponding data is valid or invalid (i.e., shown as a V/I indicator). As with the above embodiments, the indicators may be represented by a signal or bit, and may be for an entire width of a data entry or include multiple indicators for parts of the data entry (e.g., per byte, multiple bytes, burst size, and so forth). Lastly, in order to provide an appropriate HIT/MISS signal as demonstrated below, the ADDRESSEes from tag memory 108 may be read, and each of the C/D indicators and V/I indicators may be both read and written by a C/D and V/I control and response circuit 112.

In addition to the known elements of tag memory 108, it also includes at least two other aspects thereby creating a system within the present inventive embodiments. As a first aspect, in addition to indicating validity for purposes known in the art, each V/I indicator may be also be set to invalid in response to an L/E control and response circuit 114. As better appreciated below, therefore, when the life span, if any, for the data corresponding to the tag memory entry reaches its threshold, the V/I indicator is set to invalid. As a second aspect, a number of rows in tag memory 108, which in the preferred embodiment includes all N rows, includes a CLASS register in addition to the other three portions described above. The detailed functionality of the CLASS indicator in the CLASS register is described below.

Completing the remaining connections of FIG. 10, it again indicates that the CBUS may pass both a TERMINATE and CLASS signal to bus B. The CLASS signal is coupled so that it may be input to the CLASS register which corresponds to a given one of the lines when DATA is written to that line. Additionally, the CLASS signal, as well as the TERMINATE signal, are connected to both C/D and V/I control and response circuit 112 and L/E control and response circuit 114 for reasons more clear below.

The operation of the circuits of FIG. 10 share some commonality with various of the embodiments described in connection with earlier Figures and, therefore, the reader is assumed to have an understanding of the earlier-described embodiments such that some of the detail need not be re-stated below. In a first sense and as an additional aspect of the present embodiment, tag memory 108 and data memory 110 may be made to operate, based on the value of the CLASS identifier stored in a CLASS register, according to known technology. Particularly, if the value in a CLASS register is set to some predetermined value (e.g., CLASS=0), then standard cache operations may occur with respect to the DATA in the line corresponding to that CLASS register. Thus, if CLASS equals the predetermined value (e.g., 0), then an ADDRESS on bus B is connected to tag memory 108 and, provided that the ADDRESS matches an ADDRESS in tag memory 100 corresponding to valid DATA, C/D and V/I control and response circuit 112 outputs a HIT signal from which the appropriate action may be taken (i.e., depending on the request corresponding to the ADDRESS, such as reading the DATA, updating the DATA, or responding to some type of snoop). On the other hand, if the value in a CLASS register is not the predetermined value (e.g., non-zero), then the operation is more in the manner described above in connection with earlier embodiments, and as detailed below.

In addition to the known functionality of tag memory 108, note that the embodiments of FIG. 10 further include inventive operation permitting a life span to be associated with DATA in data memory 110. Specifically, recall that each row in tag memory 108 includes a CLASS register for storing a CLASS identifier. Note now that a CLASS identifier for a given row is operable to store an identification of any one of many different classes or, as described above, may be set to some predetermined value (e.g., zero) to indicate that the DATA of the row is not associated with any particular class. For example, assume that CLASS, which corresponds to $DATA_1$, states a value of 1. Therefore, only once the TERMINATE signal is asserted along with a CLASS signal of 1 is $DATA_1$ changed from live to expired. Thus, before that event, $DATA_1$ is live and may be accessed and/or updated by a circuit having access to data memory 110. Note also that the CLASS register embodiment of FIG. 10 also permits more than one row of DATA to be associated with the same CLASS identifier, or for each different row to be associated with a different CLASS identifier.

Note that the configuration of FIG. 10 as well as its operation gives rise to yet another alternative aspect, namely, in connection with the indication of whether data is live or expired. Recall that the embodiments of FIG. 7 and 9 include an L/E indicator which is separate and independent from a V/I indicator for each line. However, as an alternative, note in the embodiment of FIG. 10 that a separate and independent V/I indicator is not provided for each line. Instead, L/E control and response circuit 114 is connected so that it may modify the V/I indicator for each line of tag memory 108. As a result, once a CLASS of DATA is terminated by the TERMINATE signal, rather than setting a separate L/E indicator to expired, L/E control and response circuit 114 sets the V/I indicator for that line to invalid. Like the above embodiments, upon this event it is also determined whether the corresponding data is dirty (i.e., by its corresponding C/D indicator) and, if so, the dirty data is written to some higher level of storage so as to ensure proper memory coherency. In any event, because there is not a separate L/E indicator, the V/I indicator not only indicates whether the corresponding data is valid according to known cache policy, but may further designate the data as invalid due to an event which caused assertion of the TERMINATE signal. Consequently, because an invalid state of a V/I indicator in known cache technology indicates that data is no longer valid, note therefore that expired DATA is thereafter treated as invalid and, hence, the expired data will not be relied upon by a circuit seeking that information from data memory 110. Given this functionality, one skilled in the art will further appreciate that L/E control and response circuit 114 includes sufficient circuitry to monitor the incoming TERMINATE signal as well as the values of each CLASS register storing a non-zero CLASS identifier. Thus, when the TERMINATE signal is asserted along with the CLASS of data to be terminated, then the DATA for each line having the matching CLASS identifier will be invalidated, that is, the V/I indicator corresponding to each such line will be set by circuit 114 to invalid. As an example, assume that both $CLASS_1$ and $CLASS_2$ both identify a value of 3, and that the TERMINATE signal is asserted with a CLASS value of 3 then on bus B. Given that example, L/E control and response circuit 114 will detect the match of the CLASS signal with the values in both the $CLASS_1$ and $CLASS_2$ registers. In response, L/E control and response circuit 114 will set both $V/I_1$ and $V/I_2$ to invalid. Lastly, note that this alternative of eliminating a separate and independent L/E indicator permits data which still is live based on a lack of an applicable TERMINATE signal to otherwise be marked as invalid. For example, if a given line of DATA corresponds to a CLASS which has not been asserted along with a TERMINATE signal, and a snoop and invalidate request is received by tag memory 108 for that line, then the line will be set to invalid by C/D and V/I control and response circuit 112 even though a TERMINATE signal has not been received which corresponds to that line. In contrast, a separate L/E indication such as in FIGS. 7 and 9 will not permit such an event and therefore provides a separate indication of a line which has not been terminated in response to the TERMINATE signal. Thus, any of the embodiments herein may use either alternative, that is, either an L/E indicator separate and independent from the V/I indicator, or a single V/I indicator which operates according to known cache policies, but which additionally identifies data as invalid if the life span of that data has reached its threshold.

From the above, it may be appreciated that the above embodiments permit storage of non-cacheable data into a cache-like structure for a certain life span of that data, and this structure may be independent of, or merged with, an existing cache structure. In either event, the life spanned data may be read and modified during this time without having to seek it from main memory. Moreover, the duration of the life span may be tied to various different events and circumstances to minimize or eliminate the possibility of active operations on two different versions of data corresponding to the same address. In addition, while the present embodiments have been described in detail, various substitutions, modifications or alterations could be made to the descriptions set forth above without departing from the inventive scope. Numerous such examples are presented above. As still another example, note that various principles in this document may be practiced independent of others. For example, the life span concept of FIGS. 6 through 10 may apply to processors using techniques differing from those in FIGS. 1 through 5. As another example, note that the present embodiments may be combined with those in the earlier incorporated by reference application Ser. No. 60/029,232, filed Oct. 31, 1996, upon which U.S. patent application Ser. No. 08/962,987 filed Oct. 31, 1997 claims priority, entitled "Microprocessor Circuits And Systems With Life Spanned Storage Circuit For Storing Non-cacheable Data" (attorney docket number TI-23331P). Briefly, U.S patent application Ser. No. 08/962,987 which has the same inventors as the current patent application, also discloses a structure permitting storage of non-cacheable data into a cache-like structure for a certain life span of that data. In the incorporated patent application, however, the life span is defined by the expiration of a timer, that is, when the count in the timer times out by reaching some predetermined threshold. Thus, in the incorporated patent application, this time out causes the data to be marked as expired rather than a non-timer event as in the present patent application. However, note now that the two technologies may be combined, whereby the L/E indicator would indicate an expired status in response to the occurrence of either: (1) an event as in the present patent; or (2) the time out of a timer as in the referenced patent application. Thus, the TERMINATE signal could be asserted in response to either of these two occurrences. Still other examples are ascertainable by a person skilled in the art. Thus, the above benefits as well as the flexibility of the various examples set forth above demonstrate the many aspects of the present embodiments, which are defined by the following claims.

What is claimed is:

1. A microprocessor for coupling to an external read/write memory having an addressable storage space for storing data including non-cacheable data, said microprocessor comprising:

a non-cacheable data storage circuit for storing a portion of said data which comprises non-cacheable data recalled from the external read/write memory;

a non-cacheable address storage circuit for storing an address corresponding to said non-cacheable data stored in said non-cacheable data storage circuit;

a class storage circuit for storing a class identifier corresponding to said non-cacheable data stored in said non-cacheable data storage circuit;

an input for receiving a class signal indicating a class for a corresponding subset of non-cacheable data;

an input for receiving a terminate signal indicating expiration of a lifespan of non-cacheable data corresponding to said class signal;

an indicator for indicating a lifespan of said non-cacheable data in said non-cacheable data storage circuit is expired in response to assertions of said terminate signal and said class signal matching said class identifier; and a control circuit connected to said non-cacheable address storage circuit, said non-cacheable address storage circuit, said indicator and a read address of a central processing unit for comparing said read address to said non-cacheable address and generating a hit signal permitting said central processing unit to read from said non-cacheable data storage circuit upon an address match if said indicator indicates said non-cacheable data in said non-cacheable data storage circuit is not expired.

2. The microprocessor of claim 1 wherein:

said control circuit is further connected to a write address of said central processing unit for comparing said write address to said non-cacheable address and generating said hit signal permitting said central processing unit to write to said non-cacheable data storage circuit upon an address match if said indicator indicates said non-cacheable data in said non-cacheable data storage circuit is not expired;

and further comprising a clean/dirty indicator for indicating said non-cacheable data in said non-cacheable data storage circuit has been modified after being stored in said non-cacheable data storage circuit.

3. The microprocessor of claim 2 and further comprising: circuitry for evaluating said clean/dirty indicator; and circuitry for writing said non-cacheable data to said addressable storage space of said external read/write memory in response to said circuitry for evaluating detecting that said clean/dirty indicator has changed from a clean state to a dirty state.

4. The microprocessor of claim 3 wherein said circuitry for evaluating said clean/dirty indicator evaluates said clean/dirty indicator in response to assertions of said terminate signal and said class signal matching said class identifier.

5. The microprocessor of claim 3 wherein said circuitry for evaluating said clean/dirty indicator evaluates said clean/dirty indicator before response to assertions of said terminate signal and said class signal matching said class identifier.

6. The microprocessor of claim 1 wherein said addressable storage space of said external read/write memory includes a video display buffer storing non-cacheable display data for a screen display in a plurality of scan lines and wherein:

said terminate signal is asserted in response to a horizontal synchronization signal.

7. The microprocessor of claim 1 wherein said addressable storage space of said external read/write memory includes a video display buffer storing non-cacheable display data for a screen display in a plurality of scan lines and wherein:

said terminate signal is asserted in response to a vertical synchronization signal.

8. The microprocessor of claim 1 and further comprising:

a prefetch buffer, wherein said non-cacheable data storage circuit is a storage circuit in said prefetch buffer and wherein said prefetch buffer is operable to perform a prefetch function;

an enable signal associated with said non-cacheable data storage circuit;

wherein, whe said enable signal is asserted in a first state:
said non-cacheable data storage circuit operates according to stor said non-cacheable data; and
said indicator for indicating said non-cacheable data in said non-cacheable data storage circuit is expired is established in response to assertions of said terminate signal and said class signal matching said class identifier; and wherein, when said enable signal is asserted in a second state said non-cacheable data storage circuit operates to perform said prefetch function.

9. A microprocessor for coupling to an externalread/write memory having an addressable storage space for storing dat including non-cacheable data, said microprocessor comprising:

a non-cacheable data storage circuit for storing a portion of said data which comprises non-cacheable data;

a non-cacheable address storage circuit for storing an address corresponding to said non-cacheable data stored in said non-cacheable data storage circuit;

a class storage circuit for storing a class identifier corresponding to said non-cacheable data stored in said non-cacheable data storage circuit;

an input for receiving a class signal indicating a class for a corresponding subset of non-cacheable data;

an input for receiving a terminate signal indicating an end of a lifespan of non-cacheable data corresponding to said class signal;

an indicator for indicating said non-cacheable data in said non-cacheable data storage circuit is expired in response to assertions of said terminate signal and said class signal matching said class identifier;

a control circuit connected to said non-cacheable address storage circuit, said non-cacheable address storage circuit, said indicator and a read address of a central processing unit for comparing said read address to said non-cacheable address and generating a hit signal permitting said central processing unit to read from said non-cacheable data storage circuit upon a match;

a prefetch buffer, wherein said non-cacheable data storage circuit is a storage circuit in said prefetch buffer and wherein said prefetch buffer is operable to perform a prefetch function;

an enable signal associated with said non-cacheable data storage circuit;

wherein, when said enable signal is asserted in a first state:
said non-cacheable data storage circuit operates according to store said non-cacheable data; and
said indicator for indicating said non-cacheable data in said non-cacheable data storage circuit is expired is established in response to assertions of said terminate signal and said class signal matching said class identifier; and wherein, when said enable signal is asserted in a second state said non-cacheable data storage circuit operates to perform said prefetch function;

wherein said prefetch buffer further comprises an additional plurality of non-cacheable data storage circuits, each for storing a portion of said data which comprises non-cacheable data;

and further comprising an additional plurality of class storage circuits, wherein each of said additional plurality of class storage circuits is associated with a corresponding one of said additional plurality of non-cacheable data storage circuits and is operable to store a corresponding class identifier;

and further comprising an additional plurality of indicators corresponding to each of said additional plurality of non-cacheable data storage circuits, and for indicating said non-cacheable data in said corresponding storage circuit is expired in response to assertions of said terminate signal and said class signal matching said corresponding class identifier.

10. The microprocessor of claim 9 and further comprising:

an non-cacheable address storage circuit for storing an address corresponding to said portion of said data which comprises said non-cacheable data;

an additional plurality of non-cacheable address storage circuits, each for storing an address corresponding to said portion of said data which comprises non-cacheable data stored in a corresponding one of said additional plurality of non-cacheable data storage circuits;

circuitry for comparing a snoop address to said address stored in each of said non-cacheable address storage circuits; and circuitry for outputting a hit in response to said circuitry for comparing finding a match of said snoop address to said address in one of said non-cacheable address storage circuits and said indicators corresponding to said non-cacheable data storage circuit corresponding to said one of said non-cacheable address storage circuits indicating said data in said corresponding non-cacheable data storage circuit is not expired.

11. The microprocessor of claim 10:

and further comprising a plurality of clean/dirty indicators, wherein each of said plurality of clean/dirty indicators corresponds to one of said non-cacheable data storage circuits;

wherein each of said plurality of clean/dirty indicators is for indicating said non-cacheable data in said corresponding one of said non-cacheable data storage circuits has been modified after being stored in said non-cacheable data storage circuit;

and further comprising:
   circuitry, in response to said hit, for outputting said non-cacheable data from said non-cacheable data storage circuit corresponding to said one of said non-cacheable address storage circuits; and
   circuitry, responsive to said circuitry for outputting said portion of said non-cacheable data in response to said hit, for setting to clean said clean/dirty indicator corresponding to said non-cacheable data storage circuit corresponding to said one of said non-cacheable address storage circuits.

12. The microprocessor of claim 10:

and further comprising a plurality of valid/invalid indicators, wherein each of said plurality of valid/invalid indicators corresponds to one of said non-cacheable data storage circuits;

wherein each of said plurality of valid/invalid indicators is for indicating said non-cacheable data in said corresponding one of said non-cacheable data storage circuits is valid or invalid;

and further comprising:
   circuitry, in response to said hit, for outputting said non-cacheable data from said non-cacheable data storage circuit corresponding to said one of said non-cacheable address storage circuits; and
   circuitry, responsive to said circuitry for outputting said non-cacheable data in response to said hit, for setting to invalid from valid said valid/invalid indicator corresponding to said non-cacheable data storage circuit corresponding to said one of said non-cacheable address storage circuits.

13. A microprocessor for coupling to an external read/write memory having an addressable storage space for storing data including non-cacheable data, said microprocessor comprising:

a non-cacheable data storage circuit for storing a portion of said data which comprises non-cacheable data;

a non-cacheable address storage circuit for storing an address corresponding to said non-cacheable data stored in said non-cacheable data storage circuit;

a class storage circuit for storing a class identifier corresponding to said non-cacheable data stored in said non-cacheable data storage circuit;

an input for receiving a class signal indicating a class for a corresponding subset of non-cacheable data;

an input for receiving a terminate signal indicating an end of a lifespan of non-cacheable data corresponding to said class signal;

an indicator for indicating said non-cacheable data in said non-cacheable data storage circuit is expired in response to assertions of said terminate signal and said class signal matching said class identifier; and a control circuit connected to said non-cacheable address storage circuit, said non-cacheable address storage circuit, said indicator and a read address of a central processing unit for comparing said read address to said non-cacheable address and generating a hit signal permitting said central processing unit to read from said non-cacheable data storage circuit upon an address match if said indicator indicates said non-cacheable data in said non-cacheable data storage circuit is not expired;

wherein said portion of said data which comprises non-cacheable data comprises a first portion of said non-cacheable data;

wherein said class storage circuit for storing a class identifier corresponding to said portion of said non-cacheable data comprises a first class storage circuit for storing a class identifier corresponding to said first portion of said non-cacheable data;

wherein said indicator for indicating said portion of said non-cacheable data in said non-cacheable data storage circuit is expired comprises a first indicator;

and further comprising:
   a second non-cacheable data storage circuit for storing a second portion of said non-cacheable data;
   a second class storage circuit for storing a class identifier corresponding to said second portion of said non-cacheable data; and
   a second indicator for indicating said second portion of said non-cacheable data in said second non-cacheable data storage circuit is expired in response to assertions of said terminate signal and said class signal matching said class identifier in said second class storage circuit.

14. The microprocessor of claim 1 wherein said addressable storage space of said external read/write memory includes a disk data buffer for storing non-cacheable data and wherein:

said portion of said data stored in said non-cacheable data storage circuit comprises data for storing in said disk data buffer in said external read/write memory.

15. The microprocessor of claim 14 wherein said terminate signal is asserted in response to an amount of data stored in said disk data buffer falling below a predetermined amount of data.

16. The microprocessor of claim 1 further comprising:
   a timer having a predetermined time interval, wherein said timer is started upon initial storage of data into said non-cacheable data storage circuit and said terminate signal is asserted in response to said timer reaching said predetermined time interval.

17. The microprocessor of claim 16 wherein said timer is located on the microprocessor.

18. The microprocessor of claim 1 wherein said addressable storage space of said external read/write memory includes a video display buffer storing non-cacheable display data for a screen display in a plurality of scan lines, further comprising:
   a graphics adaptor connected to said external read/write memory for generating a raster scan video signal having interleaved horizontal synchronization signals for display from said plurality of scan lines of said video display buffer;

wherein data addresses within said external read/write memory corresponding to each of said plurality of scan lines have assigned a unique class code; and wherein said graphics adaptor generates said terminate signal and a class signal for a corresponding one of said plurality of scan lines upon each horizontal synchronization signal.

19. A microprocessor for coupling to an external read/write memory having an addressable storage space for storing data including cacheable data and non-cacheable data, said microprocessor comprising:

a plurality of data cache memories, a plurality of tag memories, one tag memory corresponding to each data cache memory, each tag memory including an address field for storing an address within the addressable storage space corresponding to data stored in the corresponding data cache memory, a valid/invalid indicator indicating whether data stored in the corresponding data cache memory is valid or invalid, a class register storing a class indicator corresponding to data stored in said corresponding data cache memory;

a cache control circuit connected to the external read/write memory, said plurality of data cache memories, said plurality of tag memories and receiving a read address of a central processing unit and a terminate signal indicating expiration of a lifespan of non-cacheable data of a corresponding class, said cache control circuit operable to compare said read address to said address field of each of said tag memories, if said read address fails to match said address field of any of said plurality of tag memories or if said read address matches said address field of any one of said plurality of tag memories and said valid/invalid indicator of said matching tag memory indicates invalid (1) recall data from said read address within said external read/write memory, (2) store said recalled data in a data cache memory, (3) store said address in said address field of said corresponding tag memory, (4) set said valid/invalid indicator of said corresponding tag memory indicating valid and (5) store a class indicator of said corresponding tag memory indicating a class corresponding to said address if said external read/write memory stores non-cacheable data at said read address and (6) store a predetermined class indicator of said corresponding tag memory indicating cacheable data if said external read/write memory stores cacheable data at said read address, if said read address matches said address field of any one of said plurality of tag memories and said valid/invalid indicator of said matching tag memory indicates valid (1) recall data from said data cache memory corresponding to said matching tag memory, compare the class of a terminate signal to said class register of all tag memories, and set said valid/invalid indicator to invalid for any tag memory in which said class of a terminate signal matches said class register, wherein no terminate signal has a class matching said predetermined class indicating cacheable data.

20. The microprocessor of claim 19, wherein:

each of said tag memories further includes a clean/dirty indicator indicating whether data stored in said corresponding data cache memory has been written to after initial storage; and said control circuit further receives a write address and write data from said central processing unit, said cache control circuit further operable to compare said write address to said address field of each of said tag memories, if said write address matches said address field of any one of said plurality of tag memories (1) store said write data into said data cache memory corresponding to said matching tag memory and (2) set said clean/dirty indicator of said matching tag memory to dirty.

21. The microprocessor of claim 20 wherein:

said cache control circuit is further operable upon receipt of a terminate signal indicating expiration of the lifespan of a class corresponding to said class indicator of any tag memory to store non-cacheable data stored in a data cache memory in said external memory at an address corresponding to said address field of any matching tag memory.

22. The microprocessor of claim 19 wherein:

said cache control circuit is further operable to store said write data in said external memory at an address corresponding to said write address.

23. A method of data processing comprising the steps of:

storing cacheable data and non-cacheable data in a unified address space in an external memory;

upon initial reading of non-cacheable data from the external memory storing the non-cacheable data, a corresponding address and a corresponding class identifier in a non-cacheable data memory;

generating a terminate signal for a corresponding class identifier upon expiration of a lifespan of non-cacheable data of the corresponding class;

indicating stored non-cacheable data is expired upon receipt of the terminate signal for the corresponding class identifier;

comparing a read address to the address corresponding to the stored non-cacheable data;

reading data from the non-cacheable data memory upon an address match between the read address and the address corresponding to the stored non-cacheable data if the non-cacheable data has not expired.

24. The method of data processing of claim 23, wherein:

said step of generating a terminate signal for a corresponding class identifier generates the terminate signal upon occurrence of a corresponding event associated with the external memory.

25. The method of data processing of claim 23, wherein:

said step of generating a terminate signal for a corresponding class identifier generates the terminate signal upon occurrence of the first of a corresponding event associated with the external memory or expiration of a predetermined interval of time following storing the non-cacheable data in the non-cacheable data memory.

26. The method of data processing of claim 23, further comprising the steps of:

comparing a write address to the address corresponding to the stored non-cacheable data;

writing data to the non-cacheable data memory upon an address match between the write address and the address corresponding to the stored non-cacheable data if the non-cacheable data has not expired.

27. The method of data processing of claim 26, further comprising:

writing data from the non-cacheable data memory to the external memory upon writing data to the non-cacheable data memory.

28. The method of data processing of claim 26, further comprising:

indicating the data stored in the non-cacheable data memory is dirty upon writing data to the non-cacheable data memory; and writing data from the non-cacheable data memory to the external memory upon the terminate signal if the data stored in the non-cacheable data memory is dirty.

* * * * *